United States Patent
Pan et al.

(10) Patent No.: US 11,610,426 B2
(45) Date of Patent: Mar. 21, 2023

(54) IN-GLASS FINGERPRINT SENSOR AND SENSING CIRCUIT THEREOF

(71) Applicant: IMAGE MATCH DESIGN INC., Hsinchu County (TW)

(72) Inventors: Yan-Quan Pan, Hsinchu County (TW); Yen-Kuo Lo, Hsinchu County (TW); Yeh-Suan Yan, Hsinchu County (TW); Chia-Ming Wu, Hsinchu County (TW)

(73) Assignee: IMAGE MATCH DESIGN INC., Hsinchu County (TW)

( * ) Notice: Subject to any disclaimer, the term of this patent is extended or adjusted under 35 U.S.C. 154(b) by 0 days.

(21) Appl. No.: 17/368,704

(22) Filed: Jul. 6, 2021

(65) Prior Publication Data

US 2022/0164562 A1 May 26, 2022

Related U.S. Application Data

(60) Provisional application No. 63/116,704, filed on Nov. 20, 2020.

(51) Int. Cl.
*G06V 40/13* (2022.01)

(52) U.S. Cl.
CPC .................................. *G06V 40/13* (2022.01)

(58) Field of Classification Search
None
See application file for complete search history.

(56) References Cited

U.S. PATENT DOCUMENTS

| 8,917,387 | B1 | 12/2014 | Lee et al. |
| 2004/0222802 | A1 | 11/2004 | Chou et al. |
| 2005/0005703 | A1* | 1/2005 | Saito .................. G01L 9/12 73/780 |
| 2005/0110103 | A1* | 5/2005 | Setlak ............... G06V 40/1306 257/350 |
| 2014/0168152 | A1 | 6/2014 | Ishizaki |
| 2016/0239701 | A1 | 8/2016 | Lee et al. |
| 2017/0032169 | A1 | 2/2017 | Pi et al. |
| 2017/0316249 | A1 | 11/2017 | Lee |
| 2017/0351364 | A1 | 12/2017 | Kim et al. |
| 2018/0268232 | A1* | 9/2018 | Kim .................. G06V 40/1382 |
| 2020/0006610 | A1 | 1/2020 | Wang et al. |
| 2020/0226347 | A1 | 7/2020 | Kurasawa et al. |

FOREIGN PATENT DOCUMENTS

TW 201546722 A 12/2015

OTHER PUBLICATIONS

First non-Final Office Action dated May 31, 2022 issued by the Taiwan Intellectual Property Office for TW patent application 110128223.

(Continued)

*Primary Examiner* — Nicholas J Lee
(74) *Attorney, Agent, or Firm* — WPAT, P.C.; Anthony King

(57) ABSTRACT

A sensor device includes a biometric sensor, which includes a substrate and a plurality of sensing electrodes over the substrate. The sensor device also includes an amplifier electrically coupled to the biometric sensor and configured to provide an output signal in response to a touch event received by the biometric sensor. The sensor device further includes an interface circuit arranged between the amplifier and the plurality of sensing electrodes.

16 Claims, 12 Drawing Sheets

(56) References Cited

OTHER PUBLICATIONS

Second non-Final Office Action dated Jul. 29, 2022 issued by the Taiwan Intellectual Property Office for TW patent application 110128223.
U.S. Pat. No. 8,917,387 serving as English translation for TW 201546722A.
Abstract translation of first non-final Office Action dated May 31, 2022.
Abstract translation of second non-final Office Action dated Jul. 29, 2022.
First non-final Office Action of the Taiwan counterpart application dated Nov. 22, 2022 by Taiwan Intellectual Patent Office.
First non-final Office Action dated Nov. 25, 2022 issued by the USPTO for U.S. Appl. No. 16/336,006.

\* cited by examiner

IN-GLASS FINGERPRINT SENSOR AND SENSING CIRCUIT THEREOF

TECHNICAL FIELD

The present disclosure is generally related to an in-glass biometric fingerprint sensor, more particularly, to a sensing device of the in-glass fingerprint sensor.

BACKGROUND

Nowadays the convenience of mobile appliances like IC cards, smart phones and notebook computers brings us better life but also into privacy threat. The more widespread these mobile appliances are, the more significant the issue on personal security is. As a result, the demand for user authentication is becoming more and more important. Some biometric features, such as fingerprint, palm print, finger vein, iris, and voiceprint, have been popularly applied in user authentication. Because of the property of low-cost, easy integration and high reliability, fingerprint sensors have been extensively developed.

SUMMARY

Embodiments of the present invention provide a device. The sensor device includes a biometric sensor, which includes a substrate and a plurality of sensing electrodes over the substrate. The sensor device also includes an amplifier electrically coupled to the biometric sensor and configured to provide an output signal in response to a touch event received by the biometric sensor. The sensor device further includes an interface circuit arranged between the amplifier and the plurality of sensing electrodes.

In some embodiments, the biometric sensor is a touch-mode biometric sensor.

In some embodiments, the biometric sensor includes a substrate formed of glass, quartz, or silicon oxide.

In some embodiments, the sensor device further includes a display disposed below the biometric sensor, wherein the substrate is transparent to light emitted by the display.

In some embodiments, the interface circuit includes a resistor.

In some embodiments, the amplifier comprises a non-inverting terminal and an inverting terminal, wherein the resistor is connected to the inverting terminal in series.

In some embodiments, wherein the amplifier comprises a first stage coupled to a second stage through a coupling capacitor, the second stage defining a transconductance, wherein the resistor has a resistance greater than about ten times an inverse of the transconductance.

In some embodiments, the interface circuit includes a current source connected between the biometric sensor and ground; an amplify capacitor coupled between the current source and the amplifier; and a first switch coupled between the current source and the amplify capacitor.

In some embodiments, the sensor device further includes a voltage buffer between at least one of the plurality of sensing electrodes and the current source.

In some embodiments, the first switch of the interface circuit is closed during a first sampling phase of a sensing operation.

In some embodiments, the interface circuit further comprises a second switch, wherein the second switch comprises a first end connected to a node between the first switch and the amplify capacitor.

In some embodiments, the first switch is open while the second switch is closed during a second sampling phase of a sensing operation.

In some embodiments, the sensor device further includes: a sensing control block configured to generate an initial sensing signal; and a signal transmission element electrically coupled to the sensing control block and configured to transmit a transmit sensing signal to a user based on the initial sensing signal in response to the touch event.

In some embodiments, the signal transmission element comprises a frame disposed over the biometric sensor and configured to be in contact with the user during the touch event.

In some embodiments, the initial sensing signal having a plurality of sensing periods, wherein each of the sensing periods include a first sampling period alternatingly arranged with a second sampling period, in which the initial sensing signal has a waveform including a rising edge and a falling edge corresponding to start time instants of the first sampling period and the second sampling period, respectively.

In some embodiments, the sensing control block is configured to generate a first sensed signal and a second sensed signal consecutively during the first sampling period and the second sampling period, respectively, for a same site of the user.

In some embodiments, the sensor device further includes a processor configured to generate a processed signal by subtracting the first sensed signal by the second sensed signal.

In some embodiments, the sensor device further includes an analog-to-digital converter configured to convert the output signal to a digital signal.

The foregoing has outlined rather broadly the features and technical advantages of the present invention in order that the detailed description of the invention that follows may be better understood. Additional features and advantages of the invention will be described hereinafter. It should be appreciated by persons having ordinary skill in the art that the conception and specific embodiments disclosed may be readily utilized as a basis for modifying or designing other structures or processes for carrying out the same purposes of the present invention without departing from the spirit and scope of the invention as set forth in the appended claims.

BRIEF DESCRIPTION OF THE DRAWINGS

Details of one or more embodiments of the disclosure are set forth in the accompanying drawings and the description below. Other features and advantages of the disclosure will be apparent from the description, drawings, and claims. Throughout the various views and illustrative embodiments, like reference numerals are used to designate like elements. Reference will now be made in detail to exemplary embodiments illustrated in the accompanying drawings.

DETAIL DESCRIPTION

In order to make the disclosure comprehensible, detailed steps and structures are provided in the following description. Obviously, implementation of the disclosure does not limit special details known by persons skilled in the art. In addition, known structures and steps are not described in detail, so as not to limit the disclosure unnecessarily. Preferred embodiments of the disclosure will be described below in detail. However, in addition to the detailed description, the disclosure may also be widely implemented in other embodiments. The scope of the disclosure is not limited to the detailed description, and is defined by the claims.

Further, it will be understood that when an element is referred to as being "connected to" or "coupled to" or "coupled with" another element, it may be directly connected to or coupled to the other element, or intervening elements may be present.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the deviation normally found in the respective testing measurements. Also, as used herein, the terms "about," "substantial" or "substantially" generally mean within 10%, 5%, 1% or 0.5% of a given value or range. Alternatively, the terms "about," "substantial" or "substantially" mean within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "about," "substantial" or "substantially." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as being from one endpoint to another endpoint or between two endpoints. All ranges disclosed herein are inclusive of the endpoints, unless specified otherwise.

Figure 1:
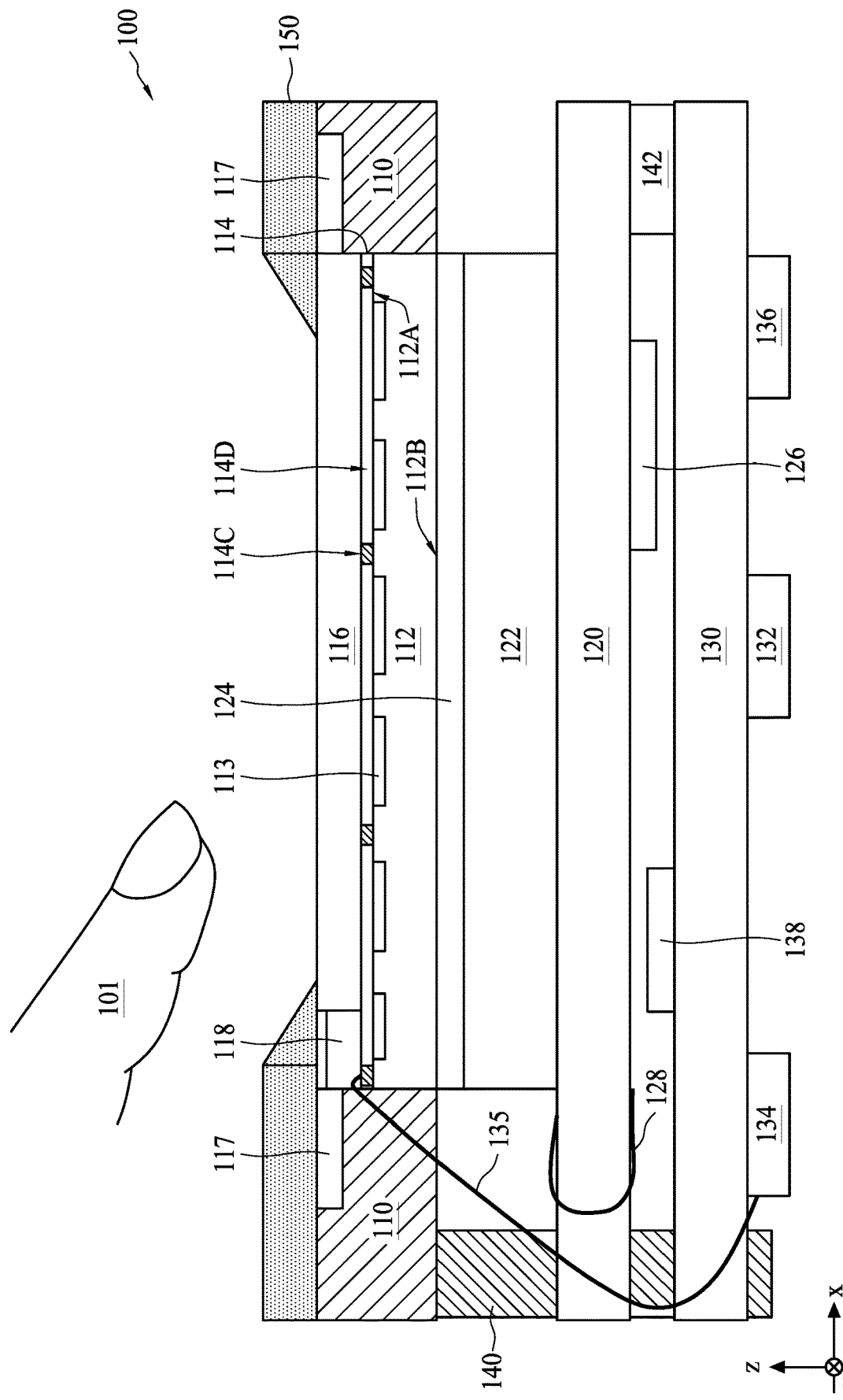
FIG. 1 is a cross-sectional view of a biometric sensor device, in accordance with some embodiments of the present invention.

FIG. 1 is a cross-sectional view of a biometric sensor device 100, in accordance with some embodiments of the present invention. In some embodiments, the biometric sensor device 100 is configured to sense biometric data and authenticate users through the biometric data. The biometric sensor device 100 may be adapted to work with an electronic device (not shown), such as a smart phone, a personal computer, and a personal digital assistant. Alternatively, the biometric sensor device 100 is adapted to work with a personal item otherwise protected by a tangible key or a password, such as a door lock, a combination lock, an identity card, a safe or the like, such that the biometric sensor device 100 can be used to protect personal information of the user in place of the key or password. In the present embodiment, the biometric sensor device 100 is a fingerprint or palm print sensor and the biometric feature includes the user's fingerprint and/or palm print patterns.

The biometric sensor device 100 may be configured as a touch-mode sensor device, in which a stimulus source, e.g., the fingerprint, may be received by the sensing elements during a touch event of the biometric sensor device 100. In some embodiments, the biometric sensor device 100 is adapted to work under a touch-less sensing mode, in which sensing signals are transmitted to the user's fingers or hands and reflected back to the biometric sensor device 100. The reflected sensing signals may contain information on the user's fingerprint or palm print patterns, and thus can be processed to authenticate the user's identity.

Referring to FIG. 1, the biometric sensor device 100 includes a first circuit board 110, a second circuit board 120, a third circuit board 130, a conductive pillar 140 and a frame 150. The biometric sensor device 100 further includes a biometric sensor 112, a protective layer 114, a cover plate 116, a display 122, and an adhesive layer 124.

In the present embodiment, the display 122 is a self-light emitting display. The display 122 is arranged over and electrically connected to the second circuit board 120. The display 122 may be formed of an organic light emitting diode (OLED) panel or other suitable self-luminous display. As an exemplary OLED display panel, the display 122 may include, but not limited to, a substrate, an anode layer, a hole transport layer, a light emitting layer, an electron transport layer, and a cathode layer arranged in a stack for emitting light in response to biasing voltages on the anode layer and the cathode layer. The display 122 may transmit light toward the user's finger or palm 101 above the cover plate 116 through the adhesive layer 124, the biometric sensor 112, the protective layer 114 and the cover plate 116. Throughout the present disclosure, the symbol 101 shown in FIG. 1 can also represent the user's palm in the context of a palm print recognition and the illustration of a user's palm will not be repeated for brevity.

The biometric sensor 112 is formed over the display 122. The biometric sensor 112 may include a fingerprint sensor configured to capture or sense fingerprint or palm print data of a user's hand. In some embodiments, the biometric sensor 112 includes a first side 112A facing toward the finger 101 or a palm of the user and a second side 112B opposite to the first side 112A. The biometric sensor 112 includes a substrate made of a transparent material. In some embodiments, the substrate is transparent to the light emitted by the display 122 such that the image of the display 122 is visible through the biometric sensor 112. In some embodiments, the light emitted by the display 122 includes a wavelength in a range of visible lights, e.g., between about 300 nm and about 700 nm. In some embodiments, the substrate of the biometric sensor 112 is formed of silicon oxide and may be in the form of glass or quartz, and thus the biometric sensor 112 is referred to herein as "in-glass fingerprint sensor."

The biometric sensor 112 includes one or more sensing electrodes 113 on the surface of the first side 112A of the substrate of the biometric sensor 112. The sensing electrodes 113 may be arranged in an array. In some embodiments, the sensing electrodes 113 include transparent conductive materials, such as indium tungsten oxide (ITO), fluorine doped tin oxide (FTO) or doped zinc oxide. In some embodiments, the biometric sensor 112 further include a sensing circuitry (not shown) around the sensing electrodes 113 and electrically connected to the sensing electrodes 113. The sensing circuitry may include one or more transistors configured to provide a sensing voltage according to the sensing capacitance or sensing voltage according to the sensing electrodes 113. In some embodiments, the sensing voltage is transmitted to the third circuit board 130 for further processing.

In some embodiments, the adhesive layer 124 is used to adhere the biometric sensor 112 to the display 122. The adhesive layer 124 may include an optically clear adhesive (OCA), such as LOCA (liquid optically clear adhesive).

The cover plate 116 is arranged over the biometric sensor 112. In some embodiments, the cover plate 116 is transparent to a radiation spectrum of the display 122, e.g., in a range between about 400 nm and about 700 nm, such that the image of the display 122 is visible to the user through the cover plate 116. In some embodiments, the cover plate 116 is made of glass or other suitable transparent materials.

In some embodiments, the protective layer 114 is formed between the biometric sensor 112 and the cover plate 116 and configured to protect the biometric sensor 112 or other features of the biometric sensor device 100 from damage by an electrostatic discharge (ESD) effect. In some embodiments, the protective layer 114 is arranged over the first side 112A of the biometric sensor 112. FIG. 2A shows a top view of the protective layer 114 overlaid with the biometric sensor 112, in which the cross-sectional view of FIG. 1 is taken from the sectional line AA of FIG. 2A. Referring to FIG. 1 and FIG. 2A, the biometric sensor 112 includes a plurality of sensing electrodes 113 configured to detect a coupled capacitance with the user's finger 101. In some embodiments, the sensing electrodes 113 are arranged in a grid or array. In some embodiments, the sensing electrodes 113 are classified into drive electrodes for providing driving signals and receive electrodes for receiving sensing signals. The drive electrodes may be alternatively arranged with the receive electrodes.

In some embodiments, the protective layer 114 includes a conductive layer 114C and an insulating layer 114D surrounding the conductive layer 114C. In some embodiments, the conductive layer 114C is formed of conductive materials, such as copper, tungsten, aluminum, or other suitable conductive materials. The insulating layer 114D is used for electrically insulate the conductive layer 114C from other conductive features of the biometric sensor device 100. The insulating layer 114D may be formed of a dielectric material, such as silicon oxide, silicon nitride, resin, epoxy, polymer, or other suitable materials.

The conductive layer 114C is formed over the array of the sensing electrodes 113 and configured to protect the sensing electrodes 113 from the ESD damage. In the present embodiment, the mesh pattern of the conductive layer 114C partitions the electrodes of the sensing electrodes 113 into electrode groups, each including four electrodes from a top-view perspective. However, the present disclosure is not limited thereto. The mesh pattern of the conductive layer 114C may be configured otherwise to partition the sensing electrodes 113 into electrode groups of various electrode numbers. In some embodiments, the protective layer 114 has a thickness in the z-direction in a range between about 1 μm and about 3 μm, such as 2 μm. In some embodiments, the first circuit board 110 has a thickness substantially equal to a thickness sum of the biometric sensor 112, the protective layer 114 and the cover plate 116. In some embodiments, the first circuit board 110 has a thickness substantially equal to a thickness sum of the biometric sensor 112, the protective layer 114, the cover plate 116 and optionally the adhesive layer 124.

Figure 2B:
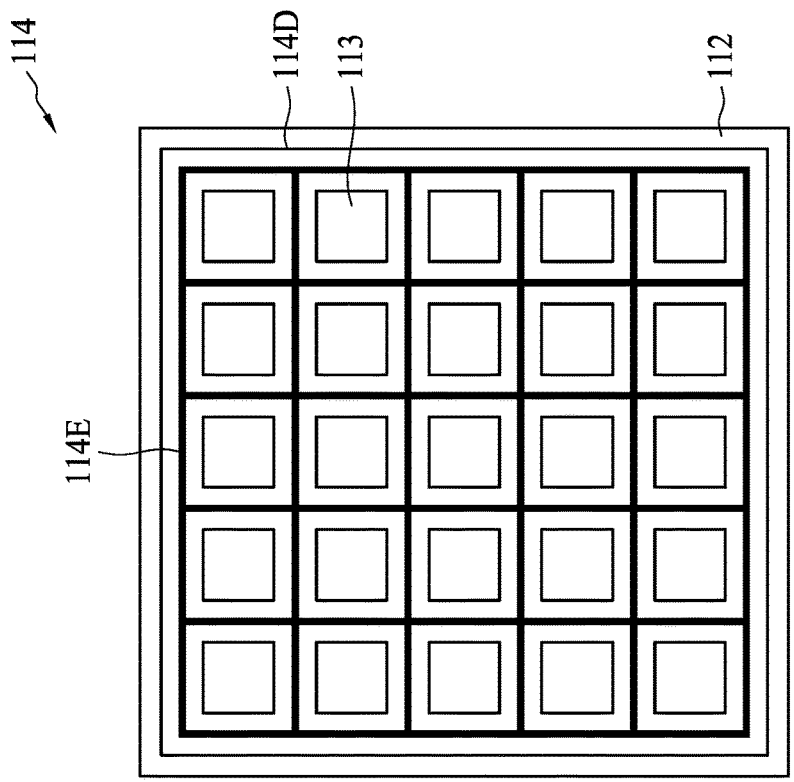
FIGS. 2A and 2B are top views of a protective layer of the biometric sensor device shown in FIG. 1, in accordance with various embodiments of the present invention.
Figure 2A:
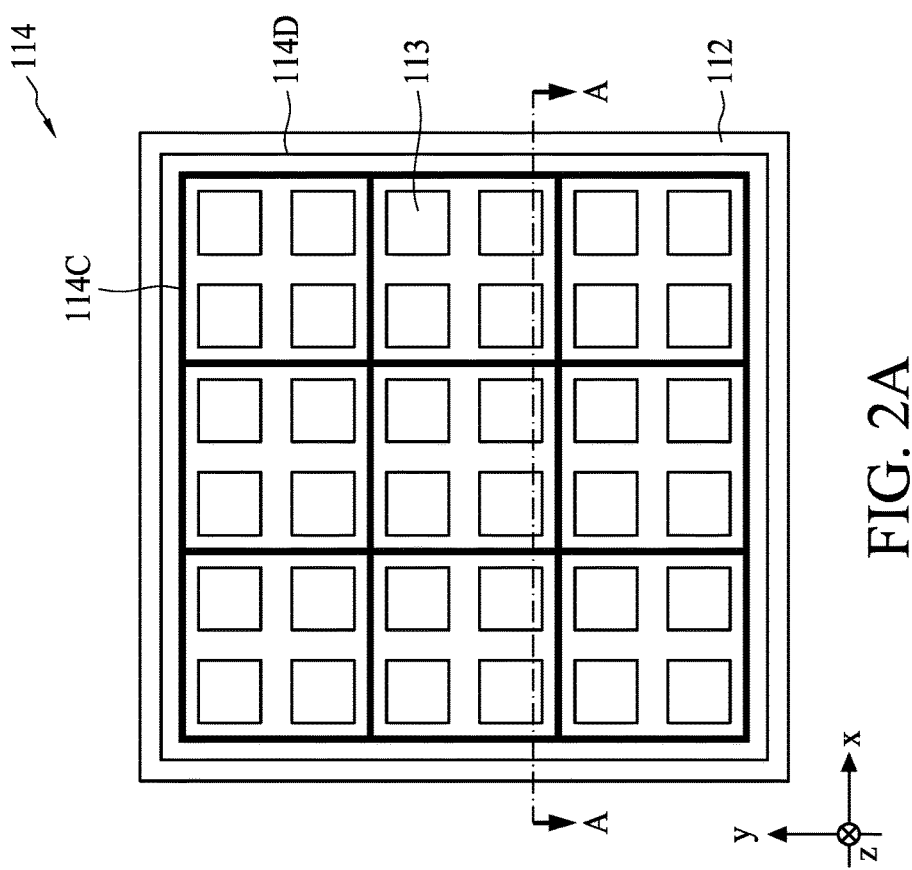

FIG. 2B is a top view of the protective layer 114 overlaid with the biometric sensor 112, in accordance with another embodiment. In the embodiment shown in FIG. 2B, the protective layer 114 includes a conductive layer 114E and an insulating layer 114D. The conductive layer 114E is similar to the conductive layer 114C in many aspects, except that the conductive layer 114E forms a mesh pattern which partitions the array of electrodes 113 into individual electrodes. In some embodiments, each of the electrodes 113 is laterally surrounded by the mesh pattern of the conductive layer 114E from a top-view perspective.

Referring to FIG. 1, the first circuit board 110, the second circuit board 120 and the third circuit board 130 are arranged in parallel along the xy-plane over one another. A stack formed of the cover plate 116, the protective layer 114, the biometric sensor 112, the adhesive layer 124 and the display 122 is formed over the second circuit board 120 and extends through the first circuit board 110. The first circuit board 110, the second circuit board 120 and the third circuit board 130 are connected by the conductive pillar 140. The conductive pillar 140 may be formed of a screw, a bolt, a nail, or other conductive members, and may run in the z-direction perpendicular to the xy-plane through the first circuit board 110, the second circuit board 120 and the third circuit board 130. In some embodiments, the circuit board 110, 120 or 130 has a thickness in the z-direction in a range between about 600 μm and about 1000 μm, such as 700 μm. In some embodiments, each of the circuit boards 110, 120 and 130 include insulating materials, e.g., a solder mask, configured to electrically insulate the conductive pillar 140 from the conductive features of the circuit boards 110, 120 and 130. The conductive pillar 140 may further serve the function of securing the circuit boards 110, 120 and 130. In some embodiments, the conductive pillar 140 is configured to provide electric signals, e.g., a sensing signal, between the circuit boards 110 and 130. The electric signals may be transmitted to the user's finger 101 and aid in establishing an electric field between the user's finger 101 and the sensing electrodes 113 to thereby generate a coupled capacitance in the presence of the user's finger 101.

The frame 150 is arranged over the first circuit board 110 and adjacent to the cover plate 116. In some embodiments, the frame 150 include a cover portion exposing the cover plate 116. The frame 150 may be formed of a rigid material for providing mechanical support of the first circuit board 110. A molding material 118 is provided between the cover plate 116 and the frame 150 to encapsulate the cover plate 116. The molding material 118 may be formed of resin, epoxy, and the like. In some embodiments, the frame 150 is formed of conductive materials and configured to receive electrical signals, in response to a touch event, to the circuit boards 110, 120 or 130. Although not separately shown, the frame 150 may include a bevel portion surrounding sidewalls of the cover plate 116, the protective layer 114 and the biometric sensor 112.

In some embodiments, the frame 150 includes a conductive material, e.g., formed of a metallic material, electrically coupled to the conductive pillar 140. The frame 150 faces the user's finger 101 and conducts electrical current through the conductive pillar 140. During operation, when the user's finger 101 touches the cover plate 116, the user's finger 101 will also touches the conductive frame 150. In this way, the finger 101 will conduct current by help of the frame 150 to facilitate the sensing process of the fingerprint. In some embodiments, the first circuit board 110 includes a conductive layer exposed from the upper surface of the first circuit board 110. The conductive layer of the first circuit board 110 may face the frame 150 and the finger 101 of the user, in which the conductive layer is configured to convey electric signals to the user's finger 101 from the conductive pillar 140 during a touch event. In some other embodiments, the frame 150 is formed of non-conductive materials, such as glass, plastics, ceramic, or the like, and the sensing signals are provided to the finger 101 in another way.

The first circuit board 110 is configured to support the frame 150. In some embodiments, the first circuit board 110 is configured to secure and electrically connect to the biometric sensor 112. The first circuit board 110 may be a printed circuit board (PCB), a metal core PCB (MCPCB) or a flexible PCB (FPCB). The first circuit board 110 may include a peripheral region defining an opening at a central portion, in which the biometric sensor 112 is embedded in the opening and laterally surrounded by the peripheral region of the first circuit board 110. In some embodiments, although not explicitly shown, the first circuit board 110 includes a bus, e.g., formed of conductive wirings or vias, electrically connected to the biometric sensor 112.

In some embodiments, the first circuit board 110 includes a conductive layer 117 formed on the upper surface of the first circuit board 110 and laterally surrounding the cover plate 116. The conductive layer 117 may be electrically coupled to the frame 150 and configured to transmit the electric signals, in response to a touch event, to the second circuit board 120 or the third circuit board 130 through the frame 150.

The second circuit board 120 includes an upper surface on which the display 122 is disposed. In some embodiments, the second circuit board 120 is configured to electrically connect the display 122 with external devices. The second circuit board 120 may be a PCB, a MCPCB or a FPCB. In some embodiments, the second circuit board 120 includes an electronic device 126 disposed on a lower surface thereof opposite to the upper surface of the second circuit board 120. The electronic device 126 may be a display driver device configured to control display functions of the display 122. In some embodiments, the second circuit board 120 includes a bus 128 to electrically connect the display 122 with the electronic device 126. The bus 128 may a bus formed as a flexible printed circuit (FPC), or including bonding wires or conductive vias extending through the second circuit board 120.

The third circuit board 130 is configured to electrically connect the first circuit board 110 and the second circuit board 120 to external devices. The third circuit board 130 may be a PCB, a MCPCB or a FPCB. The third circuit board 130 includes an electronic device 132, a connector 134 and a connection port 136 disposed on a lower surface of the circuit board 130. The third circuit board 130 also includes and an electronic device 138 and a connector 142 disposed on an upper surface opposite to the lower surface of the third circuit board 130.

The electronic device 132 may be a processor, a microcontroller, a signal processing unit, or the like configured to control the sensing functions of the biometric sensor 112 and the display functions of the display 122. The third circuit board 130 is electrically connected to the biometric sensor 112 through a bus 135, e.g., an FPC or a bonding wire, or the connector 134 on the third circuit board 130. The connector 134 may be a socket or solder pads to be electrically coupled to the bus 135. The connector 134 may be a serial connector or a parallel connector. In some embodiments, the connection port 136 is a universal serial bus (USB) port for electrically connect the third circuit board 130 with devices external to the biometric sensor device 100.

In some embodiments, the electronic device 138 is a sensor driver device configured to enable the sensing functions of the biometric sensor 112. In some embodiments, the electronic device 132 is configured to control the biometric sensor 112 and the display 122 through the electronic devices 138 and 126, respectively. The electronic device 138 may be electrically connected to the biometric sensor 112 through the bus 135 and the connector 134, and optionally through conductive vias of the third circuit board 130. In some embodiments, the electronic device 138 is configured to generate the sensing signals and transmit the sensing signals to the user's finger 101 through the first circuit board 110 or the frame 150.

The connector 142 may electrically connect the third circuit board 130 to the second circuit board 120. In some embodiments, the connector 142 includes a bus, e.g., an FPC or a bonding wire, and a socket for electrically coupling the second circuit board 120 to the third circuit board 130 to thereby provide power or signals between the circuit boards 120 and 130. The connector 142 may be a serial connector or a parallel connector.

During a touch event, the biometric sensor 112 is configured to sense the presence of the user's finger 101. The biometric sensor 112 and the electronic device 132 are configured to authenticate the user through recognizing the fingerprint pattern of the user. In some embodiments, the display 122 is configured to generate an image which contains instructions or recognition results that can be shown to the user through the in-glass biometric sensor 112. In some embodiments, the display 122 is configured to show the image to the user in response to a sensing result, associated with a biometric feature of the user, of the biometric sensor 112. In some embodiments, the display 122 is configured to display the image associated with the sensing result provided by the biometric sensor 112 before, during, or after the fingerprint recognition process is performed. Since the substrate and the sensing electrodes 113 of the biometric sensor 112 are made of transparent materials, the image of the display 122 can be readily visible to the user during the touch event. No extra areas are required for the individual biometric sensor 112 and the display 122. Therefore, the biometric sensor device 100 is capable of providing both the display and fingerprint recognition functions with a minimized device size.

In some embodiments, the biometric sensor device 100 can be applied to the application of blood oxygen detection by including a pulse oximeter (not separately shown), or simply oximeter, arranged on the second circuit board 120. In some embodiments, the oximeter can be additionally disposed over the second circuit board 120 adjacent to the display 122. The pulse oximeter may serve as a self-light emitting device. In some embodiments, the pulse oximeter is configured to measure the oxygen level in the user's blood in a non-invasive manner through transmission of sensing light to the user's finger through the biometric sensor 112 and the cover plate 116. In some embodiments, the sensing light of the pulse oximeter is in a range of red light and infrared light. In a touch event, the biometric sensor device 100 is capable of performing user authentication and blood oxygen level substantially at the same time. In addition, due to the transparent characteristics of the substrate and the sensing electrode 113 of the biometric sensor 112, the sensing light of the pulse oximeter can be readily transmitted to the user and reflected to the pulse oximeter during the touch event. When viewed from above, no extra areas are required for allocating the individual biometric sensor 112 and the pulse oximeter. Therefore, the biometric sensor device 100 is capable of providing both the blood oxygen level measurement and user authentication with a minimized device size.

Figure 3:
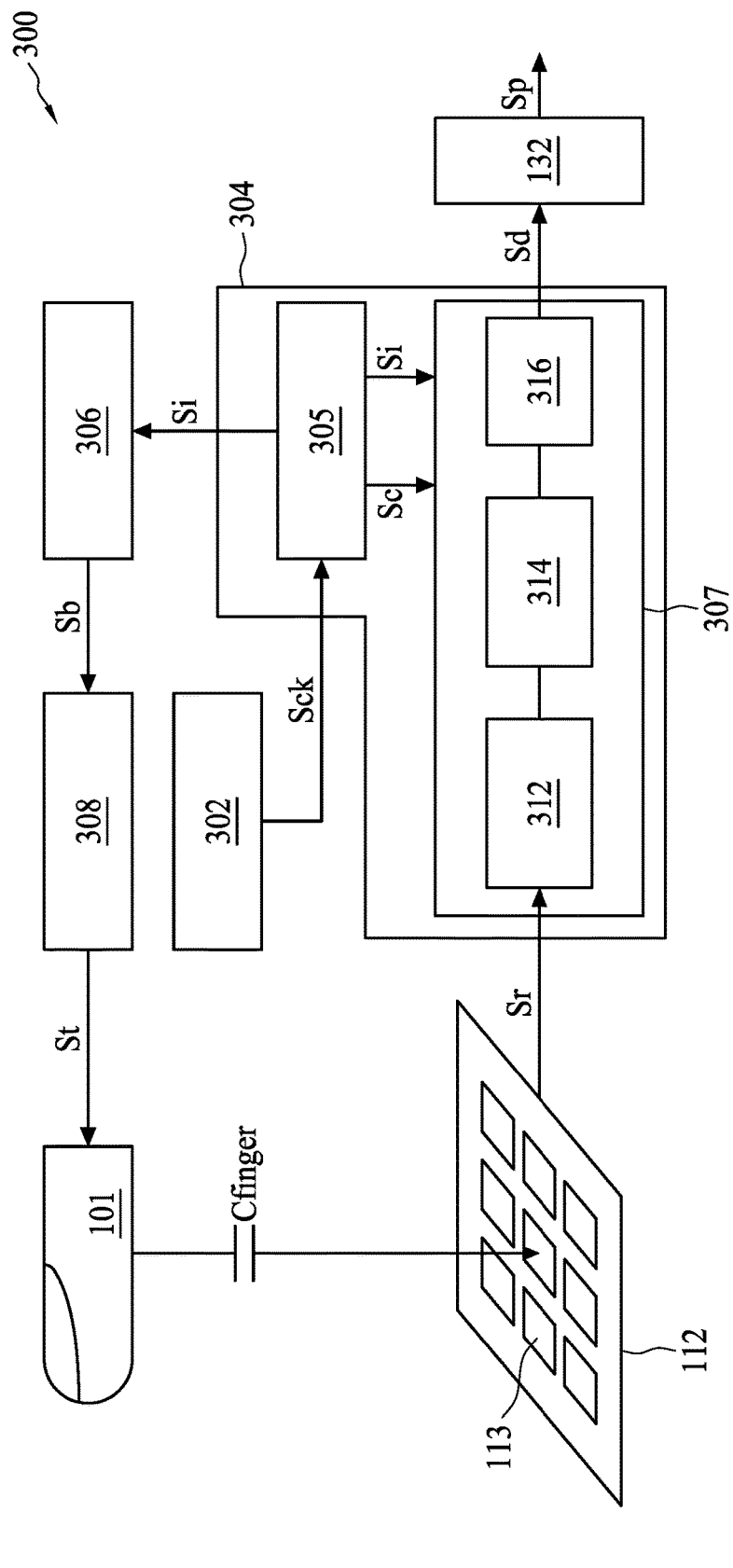
FIG. 3 is a schematic block diagram of a sensing circuit, in accordance with various embodiments of the present invention.
Figure 3:
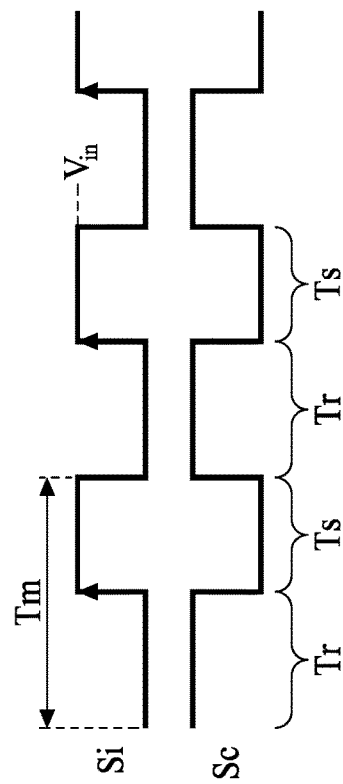

FIG. 3 is a schematic block diagram of a sensing circuit 300, in accordance with various embodiments of the present invention. The sensing circuit 300 may be formed with the elements of the biometric sensor device 100 discussed above. Referring to the top subfigure of FIG. 3, the sensing circuit 300 includes a clock generator 302, a sensing control block 304, a signal buffer block 306 and a signal transmission element 308. The sensing circuit 300 further includes the biometric sensor 112 and the electronic device 132, which are discussed previously with reference to FIG. 1, electrically connected to the sensing control block 304.

In some embodiments, the clock generator 302 is included in the sensing control block 304 and the electronic device 138 includes circuits for implementing the clock generator 302 and the sensing control block 304. In some embodiments, the biometric sensor device 100 includes more than one electronic device arranged on at least one of the circuit boards 110, 120 or 130 for implementing the clock generator 302 and the sensing control block 304 individually. In some embodiments, the signal buffer block 306 is included in the sensing control block 304 and the electronic device 138 includes circuits for implementing the sensing control block 304 and the signal buffer block 306. In some embodiments, the biometric sensor device 100 includes more than one electronic device arranged on at least one of the circuit boards 110, 120 or 130 for implementing the sensing control block 304 and the signal buffer block 306 individually.

In some embodiments, the sensing control block 304 performs regular sensing operations with help of a clock signal Sck generated by the clock generator 302. The sensing control block 304 includes a transmit sensing control module 305 and a receive sensing control module 307. During a sensing operation, in response to an activation command provided by the user or an authentication program, the transmit sensing control module 305 is configured to receive the clock signal Sck and generate an initial sensing signal Si and a control signal Sc. The transmit sensing control module 305 may further transmit the initial sensing signal Si to the finger 101 of the user through the signal buffer block 306 and the signal transmission element 308. In some embodiments, the transmit sensing control module 305 is configured to transmit the initial sensing signal Si or the control signal Sc to the receive sensing control module 307 for synchronization of receive sensing signals and control of the elements, e.g., switches, in the receive sensing control module 307. The initial sensing signal Si may be similar to the control signal Sc in waveform or sampling frequency. In some other embodiments, the initial sensing signal Si has a different waveform from the control signal Sc but is still in-phase with the control signal, e.g., the initial sensing signal Si has signal transition edges corresponding to those of the control signal Sc. In some embodiments, the signal edges of the initial sensing signal Si are synchronous with those of the control signal Sc. In some embodiments, the on-state or off-state of the initial sensing signal Si may be the same as or opposite to the on-state or the off-state, respectively, of the control signal Sc.

Referring to a bottom subfigure of FIG. 3, signal waveforms of the initial sensing signal Si and the control signal Sc are shown. In some embodiments, the initial sensing signal Si includes a signal amplitude Vin with a sensing period Tm. The sensing period Tm includes a reset period Tr and a sampling period Ts, and the duty cycle of the control signal Sc is represented as Dc=Tr/Ts. Throughout the present disclosure, the clock generator 302 provides the initial sensing signal Si with a non-zero input voltage Vin in an on-state, and a substantially zero voltage (or ground level) in an off-state. In some embodiments, the initial sensing signal Si provides a signal transition voltage +Vin with a rising edge corresponding to, or substantially aligned with, the start time instant of the sampling period Ts. The signal polarity +Vin occurring at the rising edge of the initial sensing signal Si can serve as a sensing voltage upon which a sensed voltage can be generated during the sampling period Ts. The sensed voltage may have a signal polarity, e.g., a positive or negative voltage, the same as that of the signal transition voltage.

In some embodiments, the control signal Sc is configured to control the open or closed states of the switches in the receive sensing control module 307. For example, some switches are opened and some other switches are closed according to the on-state of the control signal Sc during the reset period Tr. Similarly, the switches that are opened or closed during the reset period Tr are closed or opened, respectively, according to the off-state of the control signal Sc during the sampling period.

In some embodiments, the signal buffer block 306 is configured to buffer the initial sensing signal Si and generate a buffered sensing signal Sb. The signal buffer block 306 may also convert the voltage or current level of the initial sensing signal Si to another signal level for providing required driving capability of a sensing operation. In some embodiments, the signal buffer block 306 includes at least one of a current amplifier and a level shifter configured to generate the buffered sensing signal Sb in response to the initial sensing signal Si.

In some embodiments, the signal transmission element 308 is configured to generate a transmit sensing signal St and transmit the same to the user's finger 101 in response to the buffered sensing signal Sb. The signal transmission element 308 may transmit the buffered sensing signal Sb by contacting the finger 101 or in a contactless manner. In some embodiments, in a contact mode, the signal transmission element 308 includes the conductive layer 117 and/or the frame 150, through which the buffered sensing signal Sb is transmitted as the transmit sensing signal St. During a touch event, the finger 101 contacts the frame 150 or the conductive layer 117 on the first circuit board 110 if the frame 150 is absent. As a result, the finger 101 receives electric current provided by the transmit sensing signal St for performing sensing.

Alternatively, in a contactless mode, the signal transmission element 308 is configured to convert the sensing signal Sb from an electrical form into an optical form of the transmit sensing signal St and emits the optically modulated transmit sensing signal St to the finger 101. In some embodiments, the signal transmission element 308 includes a laser diode configured to convert the electric sensing signal Sb into an optical transmit sensing signal St and illuminate the user's finger 101 with the transmit sensing signal St.

In some embodiments, during a touch event, the finger 101 is proximal to or in contact with the biometric sensor 112 and receive the transmit sensing signal St. A capacitor Cfinger is thus generated between the finger 101 and the biometric sensor 112. Throughout the present disclosure, the symbol used for a capacitor, e.g., Cfinger, may also refer to a capacitance of this capacitor, for the convenience of labelling. The sensing electrodes 113 may generate a receive sensing signal Sr resulting from the transmit sensing signal St transmitted to the finger 101 and the capacitance Cfinger in response to a touch event.

In some embodiments, the receive sensing control module 307 is configured to receive the receive sensing signal Sr and generate an digitized sensing signal Sd, which represents a sensing result provided by a sensing electrode 113 in response to a touch event. The digitized sensing signal Sd may be transmitted to the electronic device 132, in which the individual digitized sensing signals Sd at different sites of the finger 101 detected by different sensing electrodes 113 are processed to form a processed signal Sp representative of fingerprint image of the finger 101.

In some embodiments, the receive sensing control module 307 includes an interface circuit 312, an amplification circuit 314 and an analog-to-digital converter (ADC) 316. In some embodiments, the interface circuit 312 interfaces the biometric sensor 112 with the amplification circuit 314 and configured to improve the amplification performance of the amplification circuit 314 for the in-glass type of the biometric sensor 112. The interface circuit 312 is described in greater detail in following paragraphs.

In some embodiments, the amplification circuit 314 is configured to increase the quantization resolution of the ADC 316 and reduce noise introduced during the sensing operation. In some embodiments, the amplification circuit 314 includes be an operational (OP) amplifier. In the present embodiment, the amplification circuit 314 includes a voltage amplifier; however, other types of amplifiers, e.g., a current amplifier, a transconductance amplifier or a transimpedance amplifier, are also possible. In some embodiments, the amplification circuit 314 includes a two-stage amplification design. In some embodiments, the ADC 316 is configured to convert an analog value of the receive sensing signal Sr into a digital signal serving as a digital form of the digitized sensing signal Sd for facilitating processing of the electronic device 132. In some embodiments, the ADC 316 includes a successive approximation register (SAR) ADC, a delta-sigma (ΔΣ) ADC, a dual-slope ADC, a pipelined ADC, a flash ADC, or the like.

Figure 4A:
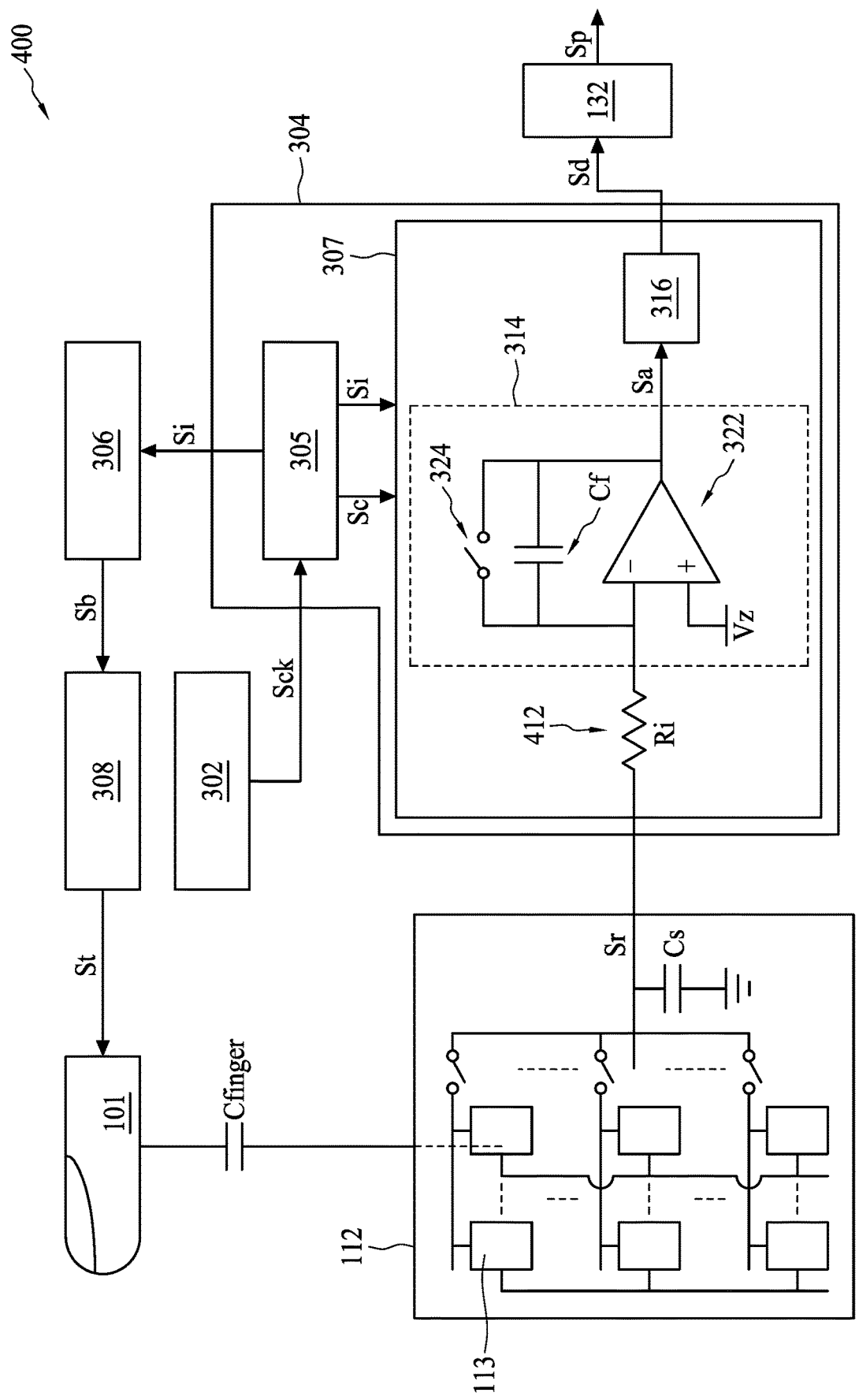
FIG. 4A is a schematic block diagram of a sensing circuit, in accordance with various embodiments of the present invention.

FIG. 4A is a schematic block diagram of a sensing circuit 400, in accordance with various embodiments of the present invention. The sensing circuit 400 can be seen as one of the implementations of the sensing circuit 300. Referring to FIG. 4A, an interface circuit 412 includes a resistive element Ri, and the amplification circuit 314 includes an amplifier 322, a feedback capacitor Cf and a switch 324. The amplifier 322 is connected to the feedback capacitor Cf and the switch 324 in parallel.

As shown in FIG. 4A, the amplifier 322 includes an inverting terminal (−) and a non-inverting terminal (+), in which the non-inverting terminal is connected to a supply voltage Vz. In some embodiments, the supply voltage Vz is predetermined as Vdd/2. In addition, the inverting terminal is coupled to the resistive element Ri. The amplifier 322 further includes an output terminal to provide an output signal Sa as the amplified sensing signal.

During a first phase of the sensing operation, i.e., the reset period Tr of a sensing period Tm, the switch 324 is closed such that the amplifier 322 is configured at a reset mode and forced to its initial state with a unity gain. During a second phase of the sensing operation, i.e., the sampling period Ts of the sensing period Tm, the switch 324 is open such that the amplifier is configured at an amplification mode and generates the output signal Sa through amplification of the receive sensing signal Sr. The timing of the switch 324 may be synchronous or in-phase with the control signal Sc, e.g., the open circuit and the closed circuit of the switch 324 respectively correspond to the off-state and on-state of the control signal Sc.

The resistive element Ri is electrically coupled between the biometric sensor 112 and the amplifier 322 of the amplification circuit 314. The resistive element Ri may be a resistor. In some embodiments, the resistive element Ri is formed through semiconductor processing processes in a metallization layer over a substrate for forming the receive sensing control module 307 or the sensing control block 304 and electrically coupled to the sensing electrodes 113 and the amplifier 322. The resistive element Ri may include a diffused-type resistors, an ion-implanted resistor, a thin-film resistor, a polysilicon resistor, or the like. In some embodiments, the resistive element Ri is a standalone resistor external to the biometric sensor 112 or the amplifier 322, e.g., the resistive element Ri is arranged on the circuit board 110, 120 or 130 and electrically coupled to the sensing electrodes 113 and the amplifier 322 via the circuit board 110, 120 or 130 via various bonding techniques, e.g., wire bonding.

The resistance (also labelled herein as Ri) of the resistor Ri is appropriately determined to enhance the stability of the amplifier 322. As discussed previously, the biometric sensor 112 includes a substrate formed of a dielectric material, such as glass, quartz, or silicon oxide. Although the biometric sensor 112 with a dielectric substrate can provide advantages, e.g., the processing cost can be reduced, the dielectric characteristic of the substrate of the biometric sensor 112 may induce a substrate capacitance Cs electrically coupled the amplification circuit 314. The substrate capacitance Cs may cause stability issues to the amplifier 322, and thus the operation bandwidth or operation current of the amplifier 322 is severely affected.

Figure 4B:
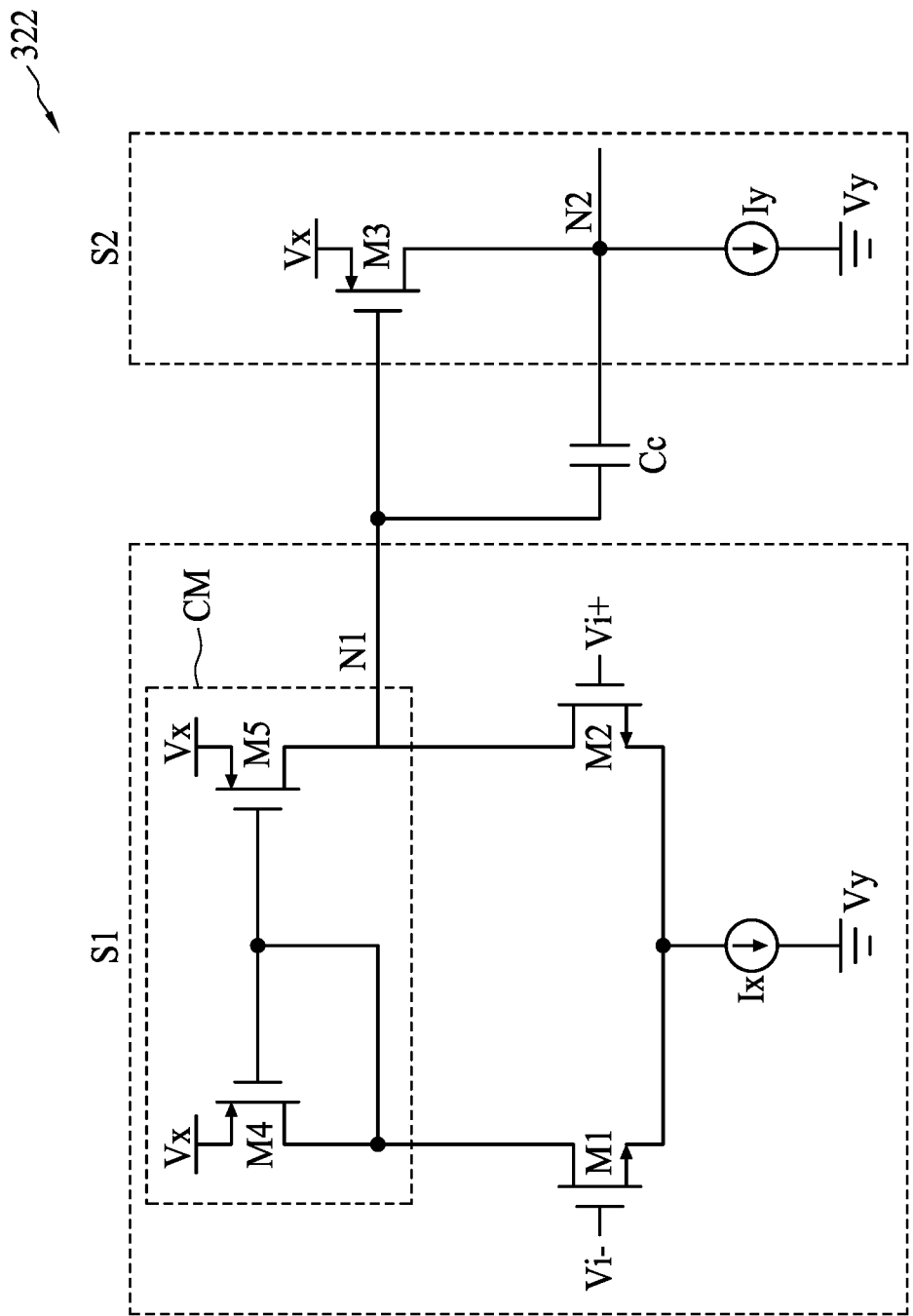
FIG. 4B is a schematic block diagram of an amplifier, in accordance with various embodiments of the present invention.

FIG. 4B is a schematic block diagram of the amplifier 322, in accordance with various embodiments of the present invention. As shown in FIG. 4B, the amplifier 322 includes a first stage S1 and a second stage S2 coupled to the first stage S1 through a coupling capacitor Cc. The implementation of the two-stage amplifier as illustrated in FIG. 4B is for illustrative purposes only. Other types of amplifiers 322 are also within the contemplated scope of the present disclosure.

Referring to FIG. 4B, the first stage S1 includes a pair of input transistors M1 and M2, in which the gate terminals of the input transistors M1 and M2 are configured as a pair of differential input terminals Vi− and Vi+ corresponding to the pair of inverting input (−) and non-inverting input (+), respectively, of the amplifier 322 show in FIG. 4A. Each of the input transistors M1 and M2 includes a drain terminal coupled to a current mirror CM and a source terminal coupled to a current load Ix.

In some embodiments, the current mirror circuit CM includes a pair of transistors M4 and M5, in which the source terminals of the transistors M4 and M5 are coupled to a supply voltage Vx, e.g., Vdd, and the drain terminals of the transistors M4 and M5 are coupled to the drain terminals of the input transistors M1 and M2, respectively. The gate terminals of the transistors M4 and M5 are electrically coupled together and also electrically coupled to the drain terminal of the transistor M4.

The current load Ix is coupled between a supply voltage Vy, i.e., a ground potential, and the source terminals of the input transistors M1 and M2. In some embodiments, the current load Ix includes a current source.

During operation, the first stage S1 is configured to provide a differential gain at an output node N1 between the drain terminal of the transistor M5 and the drain terminal of the transistor M2 in response to a differential input voltage provided to the input terminals Vi+ and Vi−.

The second stage S2 includes a transistor M3 having a gate terminal coupled to the output node N1 of the first stage S1, a source terminal coupled to the supply voltage Vx, e.g., Vdd, and a drain terminal coupled to a current load Iy. The second stage S2 includes an output node N2 coupled between the transistor M3 and the current load Iy. The output node N2 corresponds to the output terminal of the amplifier 322 shown in FIG. 4A for providing the amplified sensing signal Sa.

The current load Iy is coupled between the supply voltage Vy, i.e., a ground potential, and the transistor M3. In some embodiments, the current load Iy includes a current source. The coupling capacitor is coupled between the output node N1 of the first stage S1 and the output node N2 of the second stage S2.

During operation, the second stage S2 is configured as a class A, class B or class AB amplifier and provides an amplified voltage at the output node N2 in response to the intermediate voltage provided at the node N1 of the first stage S1.

In some embodiments, the transistors M1, M2 and M3 include metal-oxide-semiconductor (MOS) transistors, such as N-type MOS (NMOS) transistors or P-type MOS (PMOS) transistors. In some embodiments, the input transistors M1 and M2 have the same conductivity types, e.g., N-type or P-type. The current mirror CM and the current loads Ix and Iy of the amplifier 322 shown in FIG. 4B are for illustrative purposes only, and other types of current mirrors and current loads are also within the contemplated scope of the present disclosure.

In some embodiments, the output node N1 of the first stage S1 has an effective resistor (or, equivalently, resistance) R1 and an effective parasitic capacitor (or, equivalently, capacitance) C1. In some embodiments, the input transistor M1 or M2 includes a transconductance gm1 determined by the bias current, e.g., provided by the current load Ix, and the dimensions of the channel region of the respective input transistor M1 or M2, e.g., the channel length, channel width, or the like, of the input transistor M1 or M2. In some embodiments, the output node N2 of the second stage S2 has an effective resistor (or, equivalently, resistance) R2 and an effective parasitic capacitor (or, equivalently, capacitance) Cp. In some embodiments, the transistor M3 includes a transconductance gm2 determined by the bias current, e.g., provided by the current load Iy, and the dimensions of the channel region of the transistor M3, e.g., the channel length, channel width, or the like, of the transistor M3.

Figure 5A:
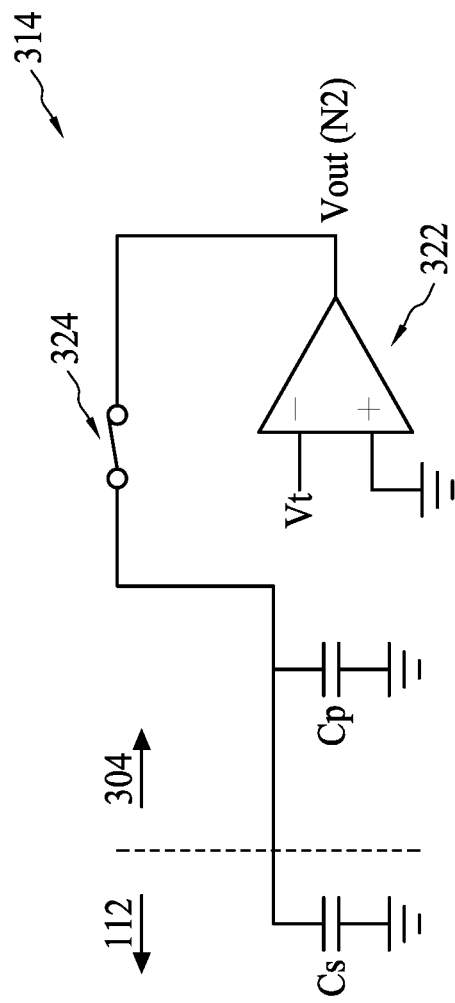
FIGS. 5A and 5B are circuit diagrams of a sensing circuit and an amplifier of the sensing circuit, respectively, in accordance with various embodiments of the present invention.
Figure 5B:
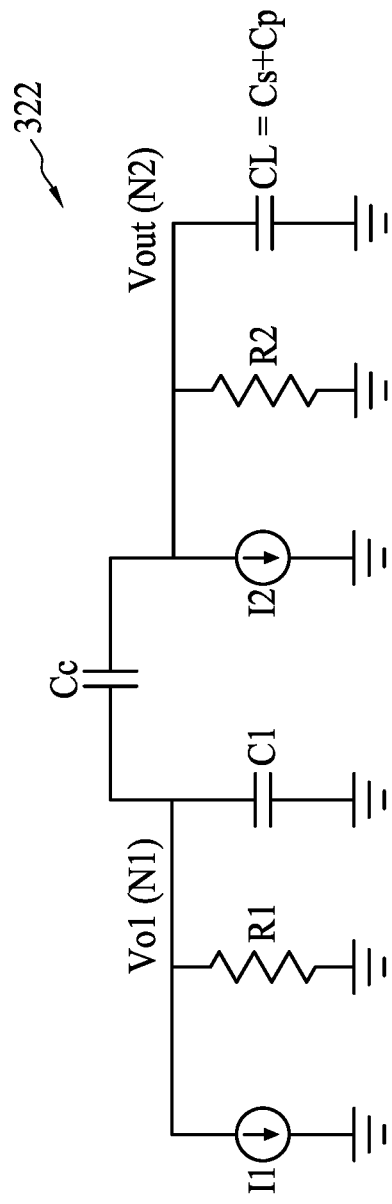

FIGS. 5A and 5B are circuit diagrams of the amplification circuit 314 and the amplifier 322, respectively, in accordance with various embodiments of the present invention. The amplification circuit 314 and the amplifier 322 shown in FIGS. 5A and 5B, respectively, represents the circuit diagrams under the small-signal analysis of the amplifier 322 shown in FIGS. 4A and 4B excluding the effects of the interface circuit 412, i.e., the resistive element Ri, and the ADC 316, to illustrate the performance of a standalone amplifier 322 shown in FIG. 4B.

Under the small-signal analysis for the reset phase, the inverting terminal (−) is disconnected from the feedback loop. Further, since the amplifier 322 is configured to amplify an input voltage Vt during the reset period Tr, the switch 324 is closed. Assume that the interface circuit 412 in FIG. 4A is absent from the receive sensing control module 307, and thus the inverting terminal (−) of the amplifier 322 is directly coupled to sensing electrodes 113 of the biometric sensor 112 or a conductive interconnection circuit between the biometric sensor 112 and the receive sensing control module 307. Based on the assumption that the interface circuit 412 is absent and that the total resistance between the biometric sensor 112 and the amplification circuit 314 is negligible, the resultant feedback loop of the amplifier 322 under the small-signal analysis can be represented as the substrate capacitance Cs connected to the parasitic capacitor Cp in parallel at the output node N2 (also labelled as "Vout") of the amplifier 322.

As shown in FIG. 5B, as far as a two-stage operational amplifier structure and the small-signal analysis is concerned, the amplifier 322 includes a first stage formed a current source I1 in parallel connection with the resistor R1 and the capacitor C1 at the output node N1 of the first stage S1. The first stage S1 provides an output terminal Vo1 at the output node N1 and the current source I1 is represented as I1=−gm1·Vt.

As illustrated in FIG. 5B, the second stage S2 is coupled to the first stage S1 by the coupling capacitor Cc. A far as the small-signal analysis is concerned, the second stage S2 is formed of a current source I2 in parallel connection with the resistor R2 and a load capacitor CL, where the capacitance of the load capacitor CL can be represented as the capacitance sum of the substrate capacitor Cs and the parasitic capacitor Cp, i.e., CL=Cs+Cp. The current source I2 is represented as I2=gm2·Vo1. The second stage S2 provides an output voltage Vout of the output signal Sa of the amplifier 322.

Based on the circuit diagram for the small-signal analysis shown in FIG. 5B, the voltage gain of the amplifier 322 can be derived as shown in the following:

$$\frac{Vout}{Vt} = \frac{-gm_1 gm_2 R_1 R_2}{\left(1 + \frac{S}{\omega_{p1}}\right)\left(1 + \frac{S}{\omega_{p2}}\right)} \quad (1)$$

In the above equation (1), the frequency response of the voltage gain Vout/Vt includes two poles $\omega_{p1}$ and $\omega_{p2}$. In some embodiments, the following conditions as listed in equation (2) are met:

$$gm_2 \gg 1/R_2 \text{ and } C_p \ll C_s. \quad (2)$$

Simplifying equation (1) using the conditions given in equation (2) leads to approximate representations of the two poles $\omega_{p1}$ and $\omega_{p2}$ as shown in the following:

$$\omega_{p1} \approx \frac{1}{R_1(gm_2 R_2 C_c)} \quad (3)$$

$$\omega_{p2} \approx \frac{1}{\frac{C_s + C_p}{gm_2 + \frac{1}{R_2}}} \approx \frac{gm_2}{C_s + C_p}$$

From the above analysis, it is clear that the second pole $\omega_{p2}$, which determines the stability of the amplifier 322, is determined by the transconductance gm2 and the capacitance sum of the substrate capacitance Cs and the parasitic capacitor Cp. The substrate capacitor Cs has a capacitance generally greater than that of the parasitic capacitor Cp, by e.g., at least ten times that of the parasitic capacitor Cp. As a result, the stability of the amplifier 322 is significantly constrained due to the reduced frequency of the second pole $\omega_{p2}$.

Figure 5C:
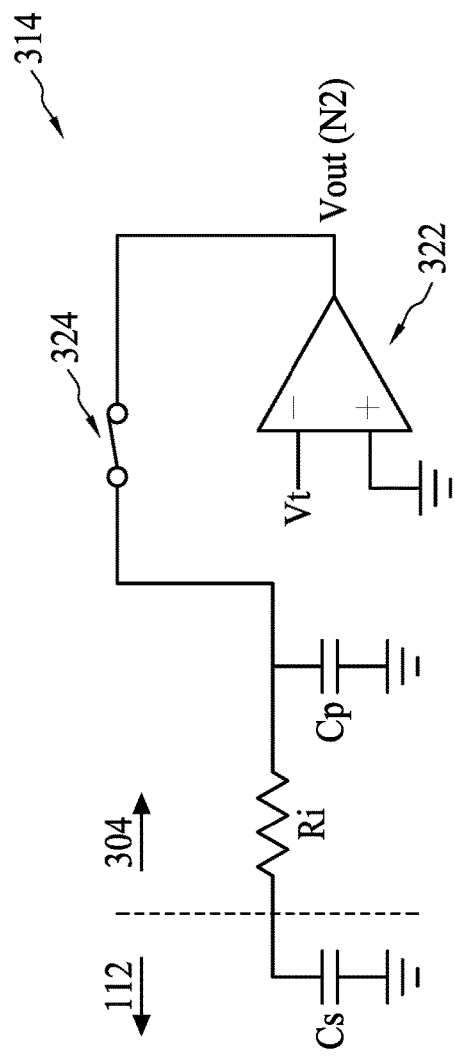
FIGS. 5C and 5D are circuit diagrams of a sensing circuit and an amplifier of the sensing circuit, respectively, in accordance with various embodiments of the present invention.
Figure 5D:
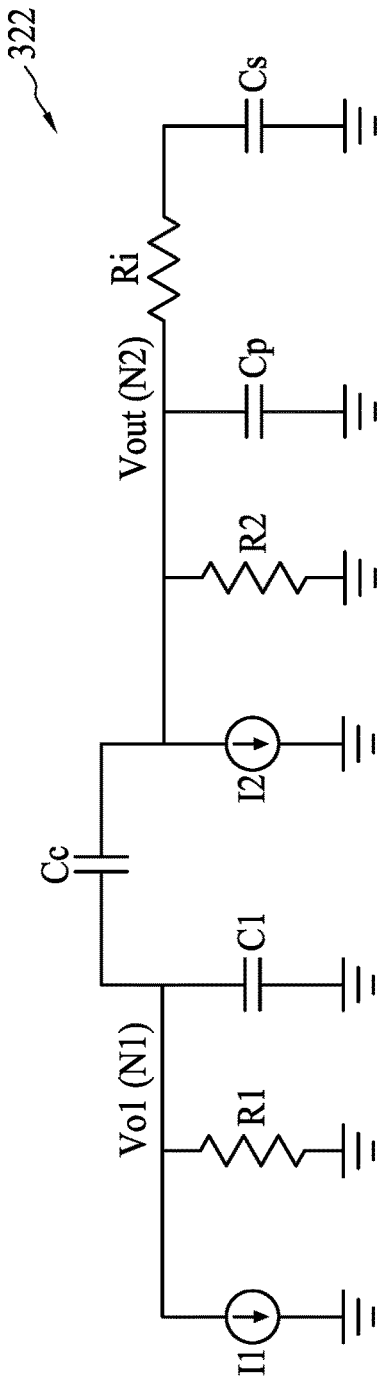

FIGS. 5C and 5D are circuit diagrams of the amplification circuit 314 and the amplifier 322, respectively, in accordance with various embodiments of the present invention. Different from the circuit diagrams shown in FIGS. 5A and 5B, the amplification circuit 314 and the amplifier 322 shown in FIGS. 5C and 5D, respectively, illustrate the small-signal analysis of the amplifier 322 shown in FIGS. 4A and 4B during the reset phase by inclusive of the interface circuit 412, i.e., the resistive element Ri. As shown in FIG. 5C, the resultant feedback loop can be represented as the parasitic capacitor Cp connected to the resistive element Ri in parallel at the output node Vout or N2, while the resistive element Ri is connected to the substrate capacitance Cs in series.

As shown in FIG. 5D, as far as a two-stage operational amplifier structure and the small-signal analysis is concerned, the first stage S1 of the amplifier 322 is represented as the current source I1 connected in parallel to the resistor R1 and the capacitor C1 of the output node Vo1 or N1 of the first stage S1. The current source I1 is represented as I1=−gm1·Vt.

The second stage S2 is represented as a current source I2 connected to the resistor R2, the parasitic capacitor Cp and the resistive element Ri in parallel at the output node Vout or N2, while the resistive element Ri is connected to the substrate capacitor Cs in series. The current source I2 is represented as I2=gm2·Vo1.

Based on the circuit diagram shown in FIG. 5D, the voltage gain of the amplifier 322 can be derived as represented in the following:

$$\frac{Vout}{Vt} = \frac{-gm_1 gm_2 R_1 R_2 \left(1+\frac{S}{\omega_z}\right)}{\left(1+\frac{S}{\omega_{p1}}\right)\left(1+\frac{S}{\omega_{p2}}\right)\left(1+\frac{S}{\omega_{p3}}\right)} \quad (4)$$

In the above equation (4), the frequency response of the voltage gain Vout/Vt includes one zero $\omega_z$ and three poles $\omega_{p1}$, $\omega_{p2}$ and $\omega_{p3}$.

In some embodiments, the conditions given in equation (2) are met. Simplifying equation (4) using conditions given in equation (2) leads to approximate representations of the three poles shown in following equation (5):

$$\omega_z = \frac{1}{R_i C_s} \quad (5)$$

$$\omega_{p1} \approx \frac{1}{R_1 (gm_2 R_2 C_c)}$$

$$\omega_{p2} \approx \frac{1}{\left(\frac{1}{gm_2}+R_i\right)C_s}$$

$$\omega_{p3} \approx \frac{gm_2 + \frac{1}{R_2} + \frac{1}{R_i}}{C_p}$$

In some embodiments, the bandwidth of the amplifier 322 is determined by the second pole $\omega_{p2}$, which is determined not only by the substrate capacitance Cs but also by the resistance of the resistive element Ri of the interface circuit 412. In some embodiments, the resistance Ri is chosen to be much greater than the inverse of transconductance gm2, i.e., Ri>>1/gm2. As a result, the second pole $\omega_{p2}$ of equation (5) can be further simplified as shown in equation (6):

$$\omega_{p2} \approx \frac{1}{R_i C_s} \quad (6)$$

$$\omega_{p3} \approx \frac{gm_2 + \frac{1}{R_2}}{C_p} \quad (7)$$

By substituting equation (6) into equation (4), the approximate zero $\omega_z$ and the approximate second pole $\omega_{p2}$ are canceled, and thus and the following equation (8) results:

$$\frac{Vout}{Vt} = \frac{-gm_1 gm_2 R_1 R_2}{\left(1+\frac{S}{\omega_{p1}}\right)\left(1+\frac{S}{\omega_{p3}}\right)} \quad (8)$$

In some embodiments, the resistive element Ri has a resistance much greater than the inverse of the transconductance gm2, e.g., greater than about ten times, greater than about twenty times, greater than about fifty times, or greater than about one hundred times, the inverse of the transconductance gm2.

Based upon equation (8), it is clear that the third pole $\omega_{p3}$, which determines the stability of the amplifier 322, is largely determined only by the parasitic capacitor Cp instead of the substrate capacitor Cs. As discussed previously, the capacitance of the substrate capacitor Cs has a capacitance generally at least ten times greater than that of the capacitor Cp. As a result, the comparison between equation (3) and equation (7) reveals that the third pole $\omega_{p3}$ of the amplifier 322 shown in FIG. 5C in the presence of the resistor Ri is significantly greater than the second pole of the amplifier 322 shown in FIG. 5A in the absence of the resistor Ri, in which the substrate capacitor Cs is much greater than parasitic capacitor Cp in capacitance. The stability and the operation frequency of the amplifier 322 can be greatly improved without sacrificing the performance of the amplifier 322.

In some embodiments, to increase the stability of the amplifier 322 the second pole $\omega_{p2}$ can be otherwise increased even in the absence of the proposed interface circuit 412. It is clear from equation (3) that increasing the second transconductance gm2 can also increase the second pole $\omega_{p2}$ proportionally. However, this arrangement means that the bias current of the current source in the second stage S2 of the amplifier 322 has to be increased, which inevitably requires greater power consumption and heat generation of the second stage S2. In contrast, the proposed interface circuit 412 can aid in increasing the second pole $\omega_{p2}$ effectively without increasing the bias current level of the second stage S2. As a result, the performance and power efficiency of the amplifier 322 can be improved in an efficient manner.

Figure 6A:
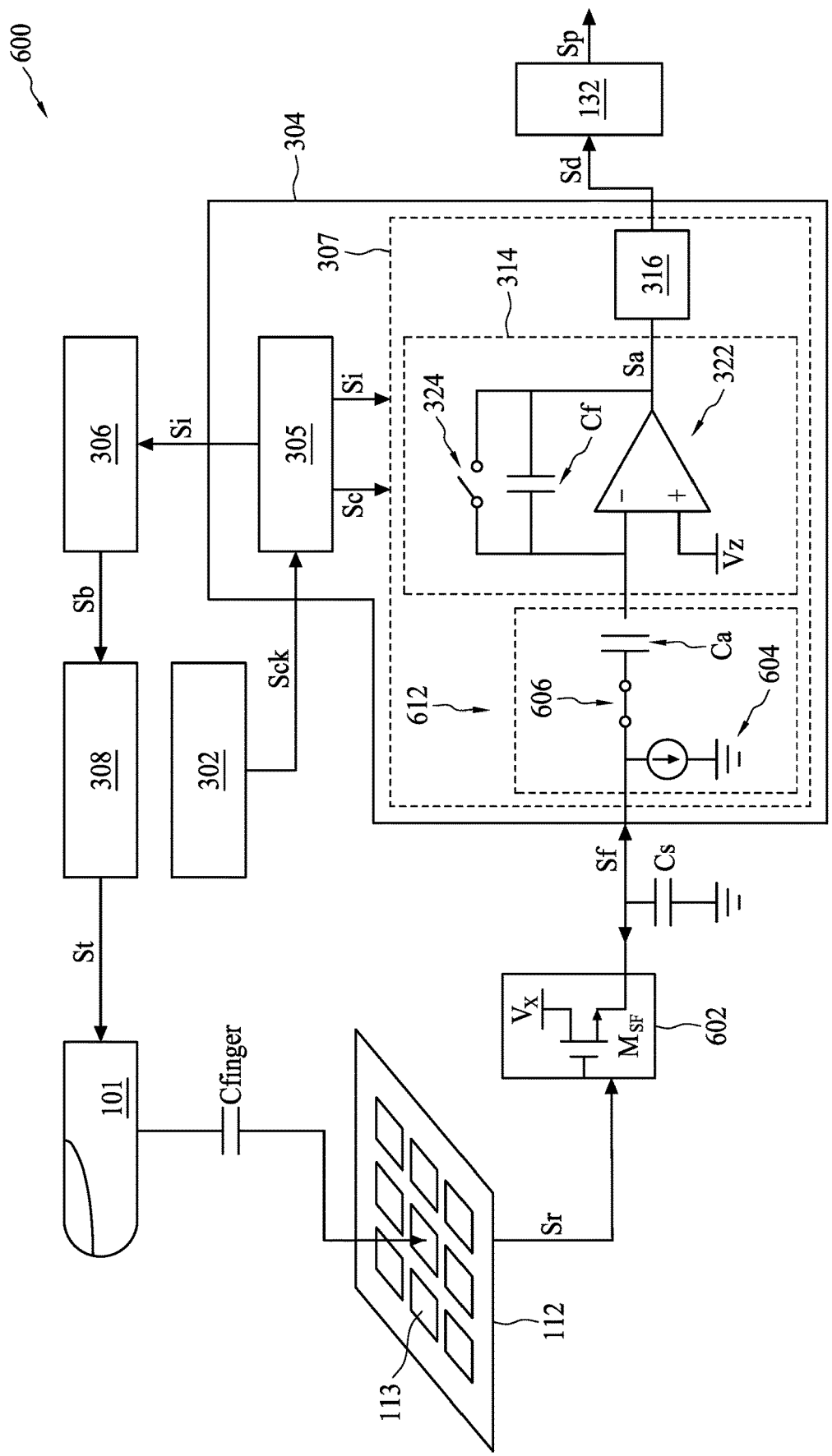
FIG. 6A is a schematic block diagram of a sensing circuit, in accordance with various embodiments of the present invention.

FIG. 6A is a schematic block diagram of a sensing circuit 600, in accordance with various embodiments of the present invention. The sensing circuit 600 is similar to the sensing circuit 400 shown in FIG. 4A in many aspects, and thus descriptions of these features of the sensing circuit 600 are not repeated for brevity. The sensing circuit 600 is different from the sensing circuit 400 in that the biometric sensor device 100 further includes a voltage buffer 602 between the biometric sensor 112 and the sensing control block 304. In addition, the receive sensing control module 307 of the sensing circuit 400 includes an interface circuit 612, which includes a current source 604, a switch 606 and an amplify capacitor Ca. The amplify capacitor Ca is arranged between the switch 606 and the inverting terminal (−) of the amplifier 322 and is connected to the feedback capacitor Cf and the switch 324 in series.

In some embodiments, the voltage buffer 602 includes a source follower or a common-drain MOS transistor, in which the voltage buffer 602 includes a gate terminal coupled to the sensing electrodes 113 of the biometric senor 112, a drain terminal coupled to the supply voltage Vx, e.g., Vdd, and a source terminal coupled to the interface circuit 612. The source terminal of the voltage buffer 602 provides a buffered receive signal Vsf in response to the receive sensing signal Sr. Although FIG. 6 illustrates only one voltage buffer 602 for the entire array of sensing electrodes 113, in some embodiments the biometric sensor 112 may include a plurality of voltage buffers 602 at the output of each row or each column of the array of sensing electrodes 113, or arranged at the output of each one of the sensing electrodes 113.

In some embodiments, the current source 604 is coupled between the input terminal of the receive control module 307 and a ground potential for providing a low-resistance output of the biometric sensor 112. In this way, the effect of the nontrivial capacitance of the substrate capacitor Cs can be effectively mitigated or neglected through the current source 604.

Figure 6B:
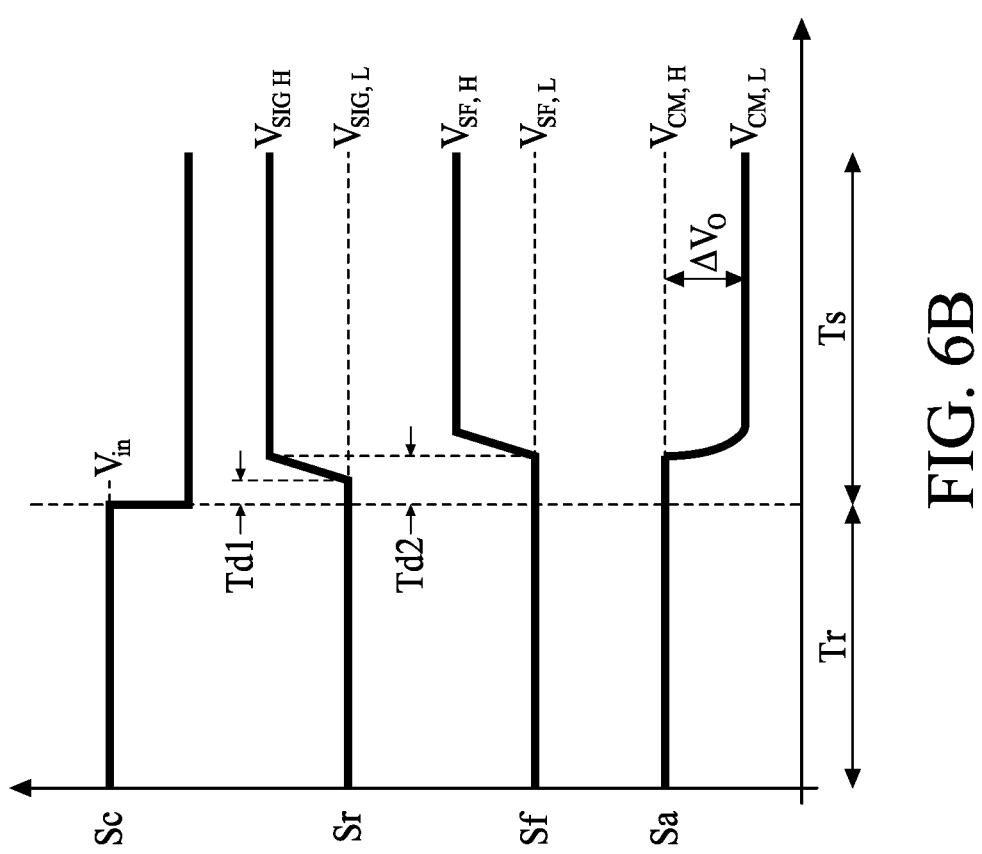
FIG. 6B shows waveforms of voltages of an interface circuit, in accordance with various embodiments of the present invention.

FIG. 6B shows waveforms of the voltages of interface circuit 612, in accordance with various embodiments of the present invention. During the sensing operation, the control signal Sc or the initial sensing signal Si is transmitted to the receive control module 307 for controlling the status of the switches 324 and 606.

In some embodiments, the proposed sensing operation with reference to FIGS. 6A and 6B takes two phases (periods) including one reset period Tr and one sampling period Ts. During the first phase of the sensing operation, i.e., the reset phase with the reset period Tr, the control signal Sc is set at a logic-high state of amplitude Vin, which causes the switch 324 to be closed. Thus, the feedback capacitor Cf is bypassed. In some embodiments, the switch 606 is closed during the reset phase. In some embodiments, the receive sensing signal Sr is set at an initial state, e.g., at a low voltage $V_{SIG, L}$ and is independent of the touch event. The voltage $V_{SF}$ at the source terminal of the voltage buffer 602 provides a buffered voltage $V_{SF, L}$. In some embodiments, a difference between the voltage $V_{SF, L}$ and the voltage $V_{SIG, L}$ follows the relationship $V_{SF, L} = V_{SIG, L} - Vgs$, in which the voltage Vgs is the turn-on voltage Vgs of the voltage buffer 602 and is greater than zero vols. In some embodiments, the output signal Sa of the amplifier 322 is set at a voltage $V_{CM}$ under a feedback mode of the amplifier 322 during the reset phase, i.e., $V_{out,1} = V_{CM}$. In some embodiments, the voltage $V_{CM}$ is predetermined as, e.g., Vdd/2. In some embodiments, the voltage $V_{CM}$ can be greater than or less than the voltage $V_{SF, L}$ or $V_{SIG, L}$. As a result, a voltage difference is generated on two ends of the amplify capacitor Ca.

During the second phase of the sensing operation, i.e., the sampling phase with the sampling period Ts, the control signal Sc is set at a logic-low state with an amplitude lower than the voltage Vin, e.g., zero volts, which causes the switch 324 to open. At the same time, the switch 606 is kept closed. The sensing electrode 113 senses a voltage change due to the presence of the capacitor Cfinger in response to a touch event, and transmits such voltage change to the receive sensing signal Sr. Therefore, the voltage of the receive sensing signal Sr increases to reach a high voltage $V_{SIG, H}$. The rising edge of the receive sensing signal Sr is behind the falling edge of the control signal Sc with a time delay Td1. The time delay Td1 is generated due to a propagation delay or processing delay between the initial sensing signal Si and the receive sensing signal Sr due to the transmit sensing control module 305, the signal buffer block 306, the signal transmission element 308 and the sensing electrode 113. In some embodiments, the time delay Td1 is introduced to ensure proper switching time of the switch 324 and normal functioning of the amplifier 322. The amplitudes of the voltage $V_{SIG,H}$, which is according to different sensed capacitances Cfinger, may vary according to different finger heights or in different sites of the finger 101 in the same touch event. As a result, the voltage $V_{SF}$ of the buffered receive sensing signal Sf increases to a high voltage $V_{SF, H}$ according to the increased voltage $V_{SIG, H}$. The voltages $V_{SF, H}$ and $V_{SIG, H}$ follows the relationship $V_{SF, H} = V_{SIG, H} - Vgs$ and the voltages difference is denoted as $\Delta V_{SIG} = V_{SIG,H} - V_{SIG,L}$. A time delay Td2 is observed between the rising edge of the buffered receive sensing signal Sf and the falling edge of the initial sensing signal Si. The time delay Td2 may be greater than the time delay Td1 due to the transmission delay of voltage buffer 602. In some embodiments, due to the presence of the feedback capacitor Cf and the increase of the receive sensing signal Sr, the output signal Sa of the amplifier 322 is driven to a low voltage as:

$$V_{out,2} = V_{CM} - (V_{SF,H} - V_{SF,L})(C_a/C_f) \qquad (9)$$

In a detection stage, the voltage difference $\Delta V_o = V_{out,2} - V_{out,1}$ is provided by:

$$\Delta V_O = \Delta V_{SIG} \times \frac{-C_a}{C_f} \qquad (10)$$

According to equation (10), the amplification effect of the amplifier 322 shown in FIG. 6A can be determined by the interface circuit 612, i.e., the ratio of the capacitance ratio between the amplify capacitor Ca and the feedback capacitor Cf, and is irrelevant to the substrate capacitor Cs. In some embodiments, the amplify capacitor Ca is determined to include a capacitance greater than that of the feedback capacitor Cf, e.g., in a range between one time and ten times of the capacitance of the feedback capacitor Cf. Based on the interface circuit 612 shown in FIG. 6A, the capacitance effect of the substrate capacitor Cs can be effectively mitigated, and the sensing operation can be improved.

Figure 6C:
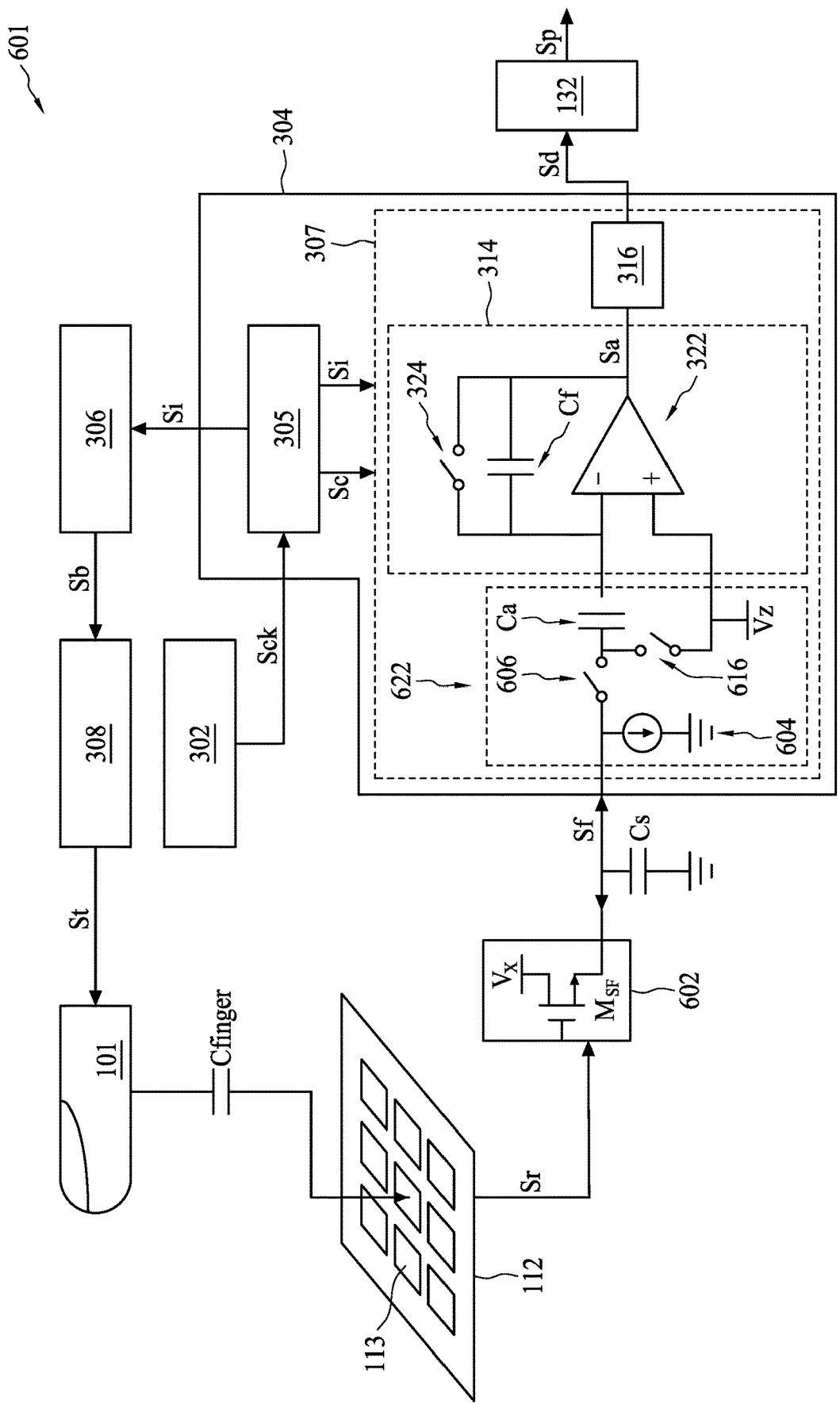
FIG. 6C is a schematic block diagram of a sensing circuit, in accordance with various embodiments of the present invention.

FIG. 6C is a schematic block diagram of a sensing circuit 601, in accordance with various embodiments of the present invention. The sensing circuit 601 is similar to the sensing circuit 600 shown in FIG. 6A in many aspects, and thus descriptions of these features of the sensing circuit 600 are not repeated for brevity. The sensing circuit 601 is different from the sensing circuit 600 in that the sensing circuit 601 includes an interface circuit 622 instead of the interface circuit 612 shown in FIG. 6A. Comparing the interface circuit 612 and the interface circuit 622, the interface circuit 622 further includes a switch 616 having a first end connected to a node between the switch 606 and the amplify capacitor Ca and a second end connected to the supply voltage Vz, e.g., Vdd/2. In some embodiments, the switch 606 is also connected to the non-inverting terminal (+) of the amplifier 322. In some embodiments, the non-inverting terminal (+) of the amplifier 322 is connected to the supply voltage Vz.

Figure 6D:
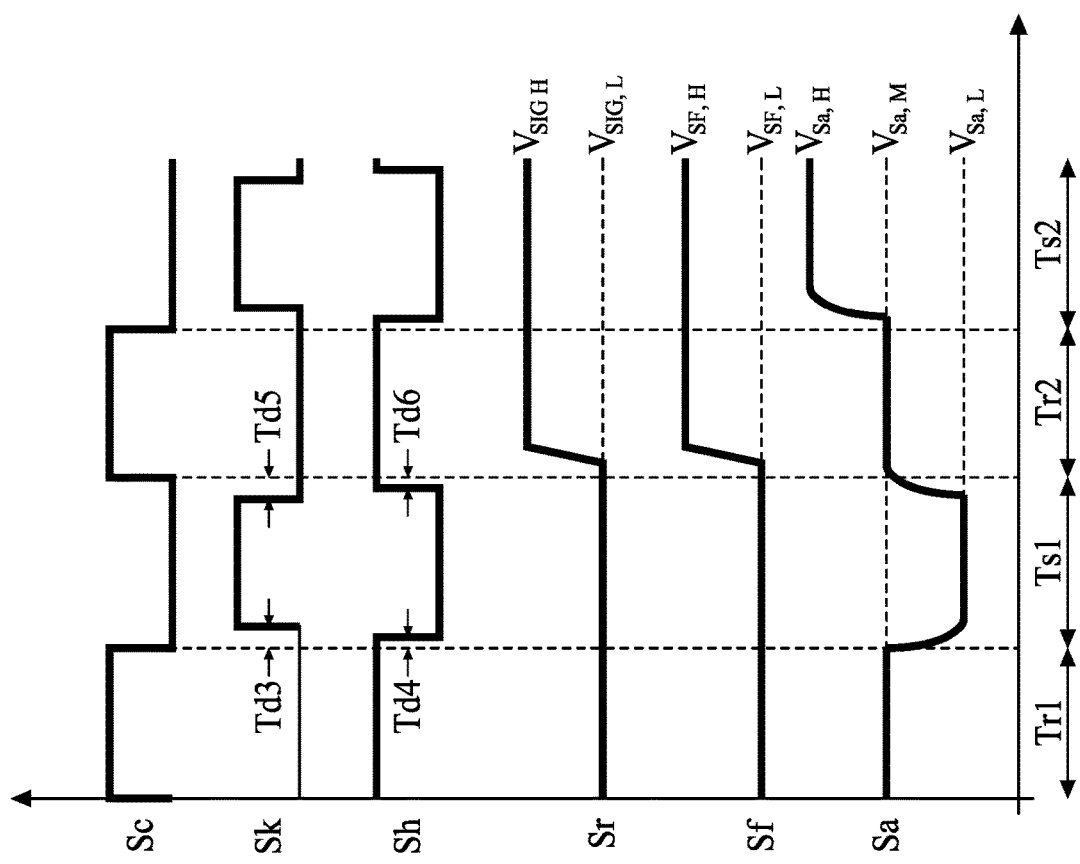
FIG. 6D shows waveforms of voltages of an interface circuit, in accordance with various embodiments of the present invention.

FIG. 6D shows waveforms of the voltages of interface circuit 622, in accordance with various embodiments of the present invention. During the sensing operation, the control signal Sc or the initial sensing signal Si is transmitted to the receive control module 307 for controlling the status of the switch 324, while additional control signals Sk and Sh are generated to control the switches 616 and 606, respectively. In some embodiments, the control signal Sh is in-phase with the control signal Sc, while the control signal Sk is anti-phase with the control signal Sc.

In some embodiments, the proposed sensing operation with reference to FIGS. 6C and 6D takes four phases (periods) including two reset periods, referred to as reset periods Tr1 and Tr2, and two sampling periods Ts, referred to as sampling periods Ts1 and Ts2. In some embodiments, the on-off status of the switches 324 and 606 is inverse to the on-off status of the switch 616 in each of the reset periods Tr1, Tr2 and the sampling periods Ts1, Ts2.

During the first phase of the sensing operation, i.e., the reset phase with the reset period Tr1, the initial sensing signal Si and the control Sh are set at a logic-high state of amplitude Vin, which causes the switches 324 and 606 to be closed. Thus, the feedback capacitor Cf is bypassed. At the same time, the control signals Sk is set at a logic-low state, which causes the switch 616 to open. In some embodiments, the receive sensing signal Sr is set at an initial state, e.g., at a low voltage $V_{SIG,L}$. The buffered receive sensing signal Sf has a buffered voltage $V_{SF,L}$ at the source terminal of the voltage buffer 602. In some embodiments, the voltage $V_{SF,L}$ is related to the voltage $V_{SIG,L}$ by $V_{SF,L}=V_{SIG,L}-Vgs$. In some embodiments, the output signal Sa of the amplifier 322 is set at an intermediate voltage $V_{Sa,M}$, e.g., Vdd/2, during the reset phase. As a result, a voltage difference is generated on two ends of the amplify capacitor Ca.

During the second phase with the first sampling period Ts1, i.e., the first sampling phase, the control signals Sc and Sh are set at a logic-low state with an amplitude lower than the voltage Vin, e.g., zero volts, which causes the respective switches 324 and 606 to open. In addition, the control signal Sk is set at a logic-high state, which causes the switch 616 to be closed. A time delay Td3 is formed between the rising edge of the control signal Sk and the falling edge of the control signal Sc, and a time delay Td4 is formed between the falling edge of the control signal Sh and the falling edge of the control signal Sc. In some embodiments, the time delay Td3 is greater than the time delay Td4. In some embodiments, the time delay Td4 is substantially greater than zero. In some embodiments, the time delays Td3 and Td4 are introduced to ensure proper switching order of the switches 324, 606 and 616 and normal functioning of the amplifier 322.

In some embodiments, during the second phase, the receive signal Sr is configured at the initial stage and is regardless of any touch event, and thus the voltages of the receive sensing signal Sr and the buffered sensing signal Sf are kept at the voltages $V_{SIG,L}$ and $V_{SF,L}$, respectively. After the switch 616 is closed, the output voltage of the amplifier 322 experiences a transition period and is driven to a first output voltage as follows:

$$V_{out,1}=V_{Sa,M}+(V_{SF,L}-V_{Sa,M})(Ca/Cf) \qquad (11)$$

During the third phase of the sensing operation, i.e., the reset phase with the reset period Tr2, the switches 324 and 606 are closed in a manner similar to the reset period Tr1. In addition, the switch 616 is opened. A time delay Td5 is formed between the falling edge of the control signal Sk and the rising edge of the control signal Sc, and a time delay Td6 is formed between the rising edge of the control signal Sh and the rising edge of the control signal Sc. In some embodiments, the time delay Td5 is greater than the time delay Td6. In some embodiments, the time delay Td6 is substantially equal to, greater, or smaller than zero. In some embodiments, the time delays Td5 and Td6 are introduced to ensure proper switching order of the switches 616, 606 and 324 and normal functioning of the amplifier 322.

During the third phase, the sensing electrodes 113 senses a touch event, and thus the receive sensing signal Sr is driven to a high voltage $V_{SIG,H}$ in response to the touch event. The source terminal of the voltage buffer 602 provides a buffered voltage $V_{SF,H}$, where $V_{SF,H}=V_{SIG,H}-Vgs$. In addition, the output signal Sa of the amplifier 322 is restored to the intermediate voltage $V_{Sa,M}$, due to the closing of the switch 324.

During the fourth phase of the sensing operation, i.e., the second sampling phase with the first sampling period Ts2, the control signals Sc and Sh are set at a logic-low state with an amplitude lower than the voltage Vin, e.g., zero volts, which causes the respective switches 324 and 606 to open. At the same time, the control signals Sk is set at a logic-high state, which causes the switch 616 to be closed. After the switch 616 is closed, the output voltage of the amplifier 322 experiences a transition period and is driven to a second output voltage as follows:

$$V_{out,2}=V_{Sa,M}+(V_{SF,H}-V_{Sa,M})(Ca/Cf) \qquad (12)$$

In a detection stage, the voltage difference $\Delta V_o=V_{out,2}-V_{out,1}$ is provided by:

$$\Delta V_O = \Delta V_{SIG} \times \frac{C_a}{C_f} \qquad (13)$$

In the above equation (13), the voltages difference is denoted as $\Delta V_{SIG}=V_{SIG,H}-V_{SIG,L}$.

According to equation (13), the amplification effect of the amplifier 322 shown in FIG. 6C can be determined by the interface circuit 622, i.e., the ratio of the capacitance ratio between the amplify capacitor Ca and the feedback capacitor Cf through appropriately controlled switches 324, 606 and 616, and is irrelevant to the substrate capacitor Cs. In some embodiments, the amplify capacitor Ca is determined to include a capacitance greater than that of the feedback capacitor Cf, e.g., in a range between one time and ten times of the capacitance of the feedback capacitor Cf. Based on the interface circuit 622 shown in FIG. 6C, the capacitance effect of the substrate capacitor Cs can be effectively mitigated, and the sensing operation can be improved.

Figure 7:
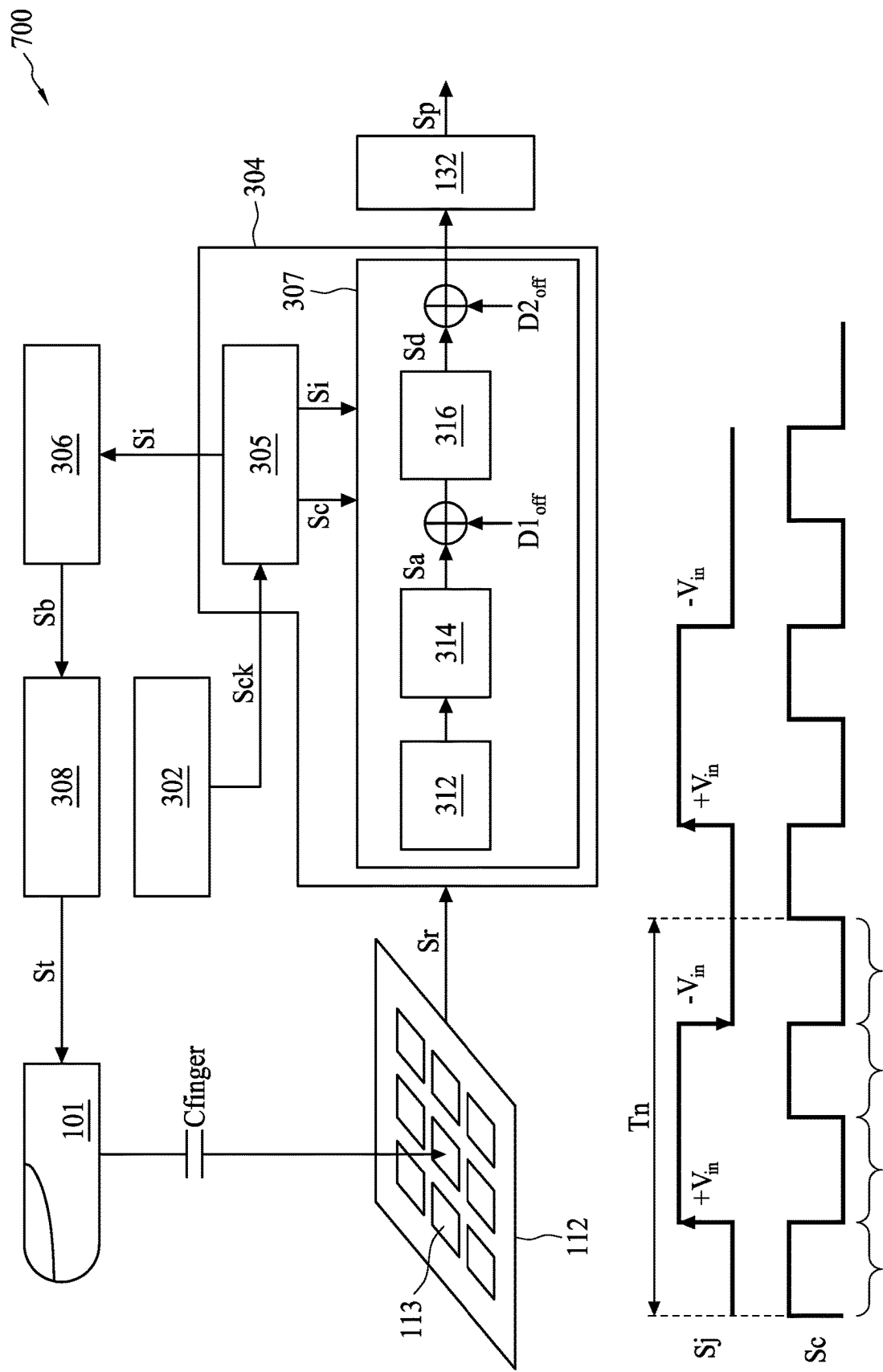
FIG. 7 is a schematic diagram of a signal model of a sensing circuit, in accordance with an embodiment of the present invention.

FIG. 7 is a schematic diagram of a signal model of a sensing circuit 700, in accordance with an embodiment of the present invention. The sensing circuit 700 is similar to the sensing circuit 300 in many aspects, and thus descriptions of these features of the sensing circuit 700 are not repeated for brevity. The sensing circuit 700 models the sensing circuit 300 under noise or interference, in which one or more sources of signal bias are introduced into the path of signal processing in the receive sensing control module 307.

In some embodiments, a first signal offset $D1_{off}$ is seen at the output node Vout of the amplification circuit 314, e.g., the output terminal of the operational amplifier 322. The signal offset $D1_{off}$ may be added to an ideal output signal Va of the amplification circuit 314. The signal offset $D1_{off}$ may arise due to the nonideal effects of an analog front-end circuit of the amplification circuit 314, e.g., an analog front-end circuit in the amplifier 322.

In some other embodiments, a second signal $D2_{off}$ is seen at the output terminal of the ADC 316. The signal offset $D2_{off}$ may be added to an ideal digitized sensing signal Sd of the ADC 316. The signal offset $D2_{off}$ may arise due to the nonideal effects of an analog front-end circuit of the ADC 316.

In the present disclosure, a new detection method is proposed to eliminate the inherited signal offsets $D1_{off}$ or $D2_{off}$ of the sensing circuit 300 or 700.

In some embodiments, the sensing control block 304 performs the sensing operation with help of a modified initial sensing signal Sj generated by the transmit sensing control module 305 in response to the clock generator 302. Referring to a bottom subfigure of FIG. 7, which shows the signal waveforms of the modified initial sensing signal Sj and the control signal Sc. In some embodiments, the sensing operation of the sensing circuit 700 comprises timed and repeated sampling operations under the timing control of the modified initial sensing signal Sj and the control signal Sc. Referring to FIG. 4A and FIG. 7, the modified initial sensing signal Sj is different from the initial sensing signal Si in that the modified initial sensing signal Sj has a sensing period Tn, which is twice the sensing period Tm of the sensing circuit 300, for a single sensing electrode 113. Each of the sensing periods Tn is formed of two reset periods Tr1 and Tr2 and two sampling periods Ts1 or Ts2 alternatingly arranged with the reset periods Tr1 and Tr2, in which the modified initial sensing signal Sj includes a rising edges +Vin and a falling edge −Vin at the start of the respective first sampling period Ts1 and the second sampling period Ts2. The first sampling period Ts1 and the second sampling period Ts2 are also referred to as the first sampling stage and the second sampling stage, respectively, of the sensing operation. The modified initial sensing signal Sj includes a waveform of substantially zero voltage in the reset periods Tr1 and Tr2, which setting is similar to that used in the initial sensing signal Si.

Referring to FIG. 3 and FIG. 7, the sensing operation of the sensing circuit 300 takes one sensing period Tm for a single sensing electrode 113 under the bias-free assumption. In contrast, the sensing operation of the sensing circuit 700 takes one sensing period Tn for completing a single sensing operation of a site of the finger 101. As a result, two consecutive sampled periods Ts1 and Ts2 are obtained in the first sampling stage and the second sampling stage during the first sampling period Ts1 and the second sampling period Ts2, respectively, for a same sensing site of the finger 101. In some embodiments, the first sampling period Ts1 and the second sampling period Ts2 have start time instants corresponding to, or substantially aligned with, the rising edge +Vin and falling edge −Vin, respectively, of the initial sensing signal Sj, at which time instants the sensing electrodes 113 are configured to generate the sensed signals Sr with amplitudes correlated to the sensed finger capacitor Cfinger. The signal polarity of the sensed signal Sr depends upon the signal transition polarity, i.e., the rising edge or falling edge, of the initial sensing signal Sj at the start of the respective sampling period Ts1 or Ts2.

In some embodiments, the electronic device 132 is configured to receive a first sensed signals P1 and a second sensed signal P2 of the same site in the first sampling stage and the second sampling stage, respectively, as represented below:

$$P1=(V_{in}*C_{finger}/C_p+D1_{off})*G_{adc}+D2_{off} \quad (14)$$

$$P2=(-V_{in}*C_{finger}/C_p+D1_{off})*G_{adc}+D2_{off} \quad (15)$$

In the above equations (14) and (15), the signal gain of the ADC 316 is denoted as the symbol $G_{adc}$. The first sensed signal P1 is obtained in response to the positive polarity of the initial sensing signal Sj, i.e., +Vin, at the start of the first sampling period Ts1, while the second sensed signal P2 is obtained in response to the negative polarity of the initial sensing signal Sj, i.e., −Vin, at the start of the second sampling period Ts2. By subtracting (14) by (15), a processed signal Sp in the final detection stage is shown below:

$$Sp=(P1-P2)/2=V_{in}*C_{finger}/C_p*G_{adc} \quad (16)$$

From the processing result as shown in equation (16), it is clear that the signal bias resulting from the first signal bias $D1_{off}$ or the second signal bias $D2_{off}$ can be effective canceled using the proposed two-stage sensing operation for a same sensing site. The signal detection performance of the sensing circuit 300 or 700 can be improved using the proposed bias cancellation scheme as discussed with reference to FIG. 7.

In some embodiments, the performance of the proposed schemes associated with the sampling periods Ts can be further improved through inclusion of more sampling periods Ts for reducing random noise. For example, referring to FIG. 7 and equations (14)-(16), the sensing operation performed within only one sensing period Tn can be extended to multiple sensing periods Tn for capturing more than one (an integer K, e.g., between two and ten) processed signals Sp. These processed signals Sp are individually generated for the same site of the finger and can be combined, e.g., by averaging, to reduce the embedded random noise. As a result, the signal-to-noise ratio of the averaged processed signal can be increased by a factor of the square root of K as compared to the single processed signal Sp obtained in equation (16).

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

What is claimed is:

1. A sensor device, comprising:
   a biometric sensor comprising:
      a substrate; and
      a plurality of sensing electrodes over the substrate;
   an amplifier electrically coupled to the biometric sensor and configured to provide an output signal in response to a touch event received by the biometric sensor; and
   an interface circuit including a resistor and arranged between the amplifier and the plurality of sensing electrodes,
   wherein the amplifier comprises a first stage coupled to a second stage through a coupling capacitor, the second stage defining a transconductance, wherein the resistor has a resistance greater than about ten times an inverse of the transconductance.

2. The sensor device of claim 1, wherein the biometric sensor is a touch-mode biometric sensor.

3. The sensor device of claim 1, wherein the biometric sensor includes a substrate formed of glass, quartz, or silicon oxide.

4. The sensor device of claim 1, further comprising a display disposed below the biometric sensor, wherein the substrate is transparent to light emitted by the display.

5. The sensor device of claim 1, wherein the amplifier comprises a non-inverting terminal and an inverting terminal, wherein the resistor is connected to the inverting terminal in series.

6. A sensor device, comprising:
a biometric sensor comprising:
a substrate; and
a plurality of sensing electrodes over the substrate;
an amplifier electrically coupled to the biometric sensor and configured to provide an output signal in response to a touch event received by the biometric sensor; and
an interface circuit arranged between the amplifier and the plurality of sensing electrodes, wherein the interface circuit comprises:
a current source connected between the biometric sensor and ground;
an amplify capacitor coupled between the current source and the amplifier; and
a first switch coupled between the current source and the amplify capacitor.

7. The sensor device of claim 6, further comprising a voltage buffer between at least one of the plurality of sensing electrodes and the current source.

8. The sensor device of claim 6, wherein the first switch of the interface circuit is closed during a first sampling phase of a sensing operation.

9. The sensor device of claim 6, wherein the interface circuit further comprises a second switch, wherein the second switch comprises a first end connected to a node between the first switch and the amplify capacitor.

10. The sensor device of claim 9, wherein the first switch is open while the second switch is closed during a second sampling phase of a sensing operation.

11. A sensor device, comprising:
a biometric sensor comprising:
a substrate; and
a plurality of sensing electrodes over the substrate;
an amplifier electrically coupled to the biometric sensor and configured to provide an output signal in response to a touch event received by the biometric sensor;
an interface circuit including a resistor and arranged between the amplifier and the plurality of sensing electrodes;
a sensing control block configured to generate an initial sensing signal; and
a signal transmission element electrically coupled to the sensing control block and configured to transmit a transmit sensing signal to a user based on the initial sensing signal in response to the touch event.

12. The sensor device of claim 11, wherein the signal transmission element comprises a frame disposed over the biometric sensor and configured to be in contact with the user during the touch event.

13. The sensor device of claim 11, wherein the initial sensing signal having a plurality of sensing periods, wherein each of the sensing periods include a first sampling period alternatingly arranged with a second sampling period, in which the initial sensing signal has a waveform including a rising edge and a falling edge corresponding to start time instants of the first sampling period and the second sampling period, respectively.

14. The sensor device of claim 13, wherein the sensing control block is configured to generate a first sensed signal and a second sensed signal consecutively during the first sampling period and the second sampling period, respectively, for a same site of the user.

15. The sensor device of claim 14, further comprising a processor configured to generate a processed signal by subtracting the first sensed signal by the second sensed signal.

16. The sensor device of claim 1, further comprising an analog-to-digital converter configured to convert the output signal to a digital signal.

\* \* \* \* \*